United States Patent
Komine et al.

(10) Patent No.: US 6,760,733 B1
(45) Date of Patent: Jul. 6, 2004

(54) OBJECT MANAGEMENT SYSTEM AND DATA PROCESSING SYSTEM WITH CENTRALIZED MECHANISM FOR MANAGING CONTAINMENT RELATIONSHIPS AMONG OBJECTS

(75) Inventors: Hiroaki Komine, Kawasaki (JP); Noriyuki Yokoshi, Kawasaki (JP); Kazuaki Ikeda, Kanazawa (JP); Tsuyoshi Naka, Kanazawa (JP); Toshiharu Nakamura, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/334,172

(22) Filed: Jun. 15, 1999

(30) Foreign Application Priority Data

Sep. 10, 1998 (JP) .......................................... 10-256366

(51) Int. Cl.[7] .............................................. G06F 17/30
(52) U.S. Cl. ...................................... 707/102; 707/100
(58) Field of Search ................................ 707/103, 104, 707/100; 709/200, 223, 224, 226

(56) References Cited

U.S. PATENT DOCUMENTS

| | | | | |
|---|---|---|---|---|
| 5,165,018 A | * | 11/1992 | Simor ......................... | 709/222 |
| 5,315,057 A | * | 5/1994 | Land et al. ................. | 707/100 |
| 5,608,720 A | * | 3/1997 | Biegel et al. ............... | 370/249 |
| 5,651,006 A | * | 7/1997 | Fujino et al. ............... | 370/408 |
| 5,659,736 A | * | 8/1997 | Hasegawa et al. .......... | 707/100 |
| 6,167,438 A | * | 12/2000 | Yates et al. ................. | 709/216 |
| 6,314,464 B1 | * | 11/2001 | Murata et al. .............. | 709/226 |
| 6,425,017 B1 | * | 7/2002 | Dievendorff et al. ....... | 709/315 |

* cited by examiner

Primary Examiner—Charles Rones
Assistant Examiner—Neveen Abel-Jalil
(74) Attorney, Agent, or Firm—Katten Muchin; Zavis Rosenman

(57) ABSTRACT

An object management system and data processing system which enable the containment relationships among a plurality of resource managers to be changed without affecting client applications which use services of those resource managers. A tree manager maintains tree structure data that defines the containment relationships among resource managers, together with identification data that is used to distinguish between them. From this tree structure data, an object manager builds a containment tree to grasp the containment relationships among the resource managers. When a client application issues an operation request to one of the resource managers, a message processor receives and forwards it to the object manager. The object manager then searches the containment tree to find identification data of a relevant resource manager for which the received operation request should be destined, thus sending the request to the found destination resource manager. This centralized approach of object management facilitates addition and removal of resource managers to/from the tree structure data.

16 Claims, 41 Drawing Sheets

RMIB DATA

| RDN OF RM | NAME OF PARENT RM | FULL NAME OF RM |
|---|---|---|
| RM1 | : | RM1 : ResourceManager |
| RM2 | RM1 : ResourceManager | RM1 : : RM2 : ResourceManager |
| RM3 | RM1 : ResourceManager | RM1 : : RM3 : ResourceManager |
| RM4 | RM1 : : RM2 : ResourceManager | RM1 : : RM2 : : RM4 : ResourceManager |
| RM5 | RM1 : : RM2 : ResourceManager | RM1 : : RM2 : : RM5 : ResourceManager |
| RM6 | RM1 : : RM3 : Resourcemanager | RM1 : : RM3 : : RM6 : ResourceManager |

TABLE DATA 121

| RDN OF RM | NAME OF PARENT RM | NAME OF NODE OBJECT (=NAME OF RM) | OBJECT ID INFORMATION |
|---|---|---|---|
| RM1 | : | RM1 : ResourceManager | |
| RM2 | RM1 : ResourceManager | RM1 : : RM2 : ResourceManager | |
| RM3 | RM1 : ResourceManager | RM1 : : RM3 : ResourceManager | |
| RM4 | RM1 : : RM2 : ResourceManager | RM1 : : RM2 : : RM4 : ResourceManager | |
| RM5 | RM1 : : RM2 : ResourceManager | RM1 : : RM2 : : RM5 : ResourceManager | |
| RM6 | RM1 : : RM3 : Resourcemanager | RM1 : : RM3 : : RM6 : ResourceManager | |

FIG. 5

TABLE DATA

| RDN OF RM | NAME OF PARENT RM | NAME OF NODE OBJECT (=NAME OF RM) | OBJECT ID INFORMATION |
|---|---|---|---|
| RM1 | : | RM1 : ResourceManager | OBJECT ID OF RM1 |
| RM2 | RM1 : ResourceManager | RM1 : : RM2 : ResourceManager | OBJECT ID OF RM2 |
| RM3 | RM1 : ResourceManager | RM1 : : RM3 : ResourceManager | OBJECT ID OF RM3 |
| RM4 | RM1 : : RM2 : ResourceManager | RM1 : : RM2 : : RM4 : ResourceManager | OBJECT ID OF RM4 |
| RM5 | RM1 : : RM2 : ResourceManager | RM1 : : RM2 : : RM5 : ResourceManager | OBJECT ID OF RM5 |
| RM6 | RM1 : : RM3 : Resourcemanager | RM1 : : RM3 : : RM6 : ResourceManager | OBJECT ID OF RM6 |

121

F I G. 6

TABLE DATA

| RDN OF RM | NAME OF PARENT RM | NAME OF NODE OBJECT (=NAME OF RM) | OBJECT ID INFORMATION | |
|---|---|---|---|---|
| RM1 | : | RM1 : ResourceManager | OBJECT ID OF RM1 | |
| RM2 | RM1 : ResourceManager | RM1 : : RM2 : ResourceManager | OBJECT ID OF RM2 | |
| RM3 | RM1 : ResourceManager | RM1 : : RM3 : ResourceManager | OBJECT ID OF RM3 | |
| RM4 | RM1 : : RM2 : ResourceManager | RM1 : : RM2 : : RM4 : ResourceManager | OBJECT ID OF RM4 | ★TO BE DELETED |
| RM5 | RM1 : : RM2 : ResourceManager | RM1 : : RM2 : : RM5 : ResourceManager | OBJECT ID OF RM5 | |
| RM6 | RM1 : : RM3 : Resourcemanager | RM1 : : RM3 : : RM6 : ResourceManager | OBJECT ID OF RM6 | |

UPDATE

| RDN OF RM | NAME OF PARENT RM | NAME OF NODE OBJECT (=NAME OF RM)) | OBJECT ID INFORMATION | |
|---|---|---|---|---|
| RM1 | : | RM1 : ResourceManager | OBJECT ID OF RM1 | |
| RM2 | RM1 : ResourceManager | RM1 : : RM2 : ResourceManager | OBJECT ID OF RM2 | |
| RM3 | RM1 : ResourceManager | RM1 : : RM3 : ResourceManager | OBJECT ID OF RM3 | |
| RM5 | RM1 : : RM2 : ResourceManager | RM1 : : RM2 : : RM5 : ResourceManager | OBJECT ID OF RM5 | |
| RM6 | RM1 : : RM3 : ResourceManager | RM1 : : RM3 : : RM6 : ResourceManager | OBJECT ID OF RM6 | |
| RM7 | RM1 : : RM3 : : RM6 : ResourceManager | RM1 : : RM3 : : RM6 : : RM7 : ResourceManager | OBJECT ID OF RM7 | ☆ADDED |

FIG. 9

RMIB DATA 201

| RDN OF RM | NAME OF PARENT RM | FULL NAME OF RM |
|---|---|---|
| System | : | System : ResourceManager |
| Admin | System : ResourceManager | System : : Admin : ResourceManager |
| Layer | Layer : ResourceManager | System : : Layer : ResourceManager |
| SubNetwork | System : : Layer : Resourcemanager | System : : Layer : : SubNetwork : ResourceManager |
| Node | System : : Layer : : SubNetworkResourceManager | System : : Layer : : SubNetwork : : Node : ResourceManager |
| Link | System : : Layer : : SubNetworkResourceManager | System : : Layer : : SubNetwork : : Link : ResourceManager |

FIG. 25

TABLE DATA 221

| RDN OF RM | NAME OF PARENT RM | NAME OF NODE OBJECT (=NAME OF RM) | OBJECT ID INFORMATION |
|---|---|---|---|
| System | : | System::ResourceManager | OBJECT ID OF System |
| Admin | System:ResourceManager | System::Admin:ResourceManager | OBJECT ID OF Admin |
| Layer | Layer:ResourceManager | System::Layer:ResourceManager | OBJECT ID OF Layer |
| SubNetwork | System::Layer:Resourcemanager | System::Layer::SubNetwork:ResourceManager | OBJECT ID OF SubNetwork |
| Node | System::Layer::SubNetworkResourceManager | System::Layer::SubNetwork::Node:ResourceManager | OBJECT ID OF Node |
| Link | System::Layer::SubNetworkResourceManager | System::Layer::SubNetwork::Link:ResourceManager | OBJECT ID OF Link |

FIG. 27

RMIB DATA

| RDN OF RM | NAME OF PARENT RM | FULL NAME OF RM |
|---|---|---|
| System | : | System : ResourceManager |
| Admin | System : ResourceManager | System : : Admin : ResourceManager |
| Layer | Layer : ResourceManager | System : : Layer : ResourceManager |
| SubNetwork | System : : Layer : Resourcemanager | System : : Layer : : SubNetwork : ResourceManager |
| Node | System : : Layer : : SubNetworkResourceManager | System : : Layer : : SubNetwork : : Node : ResourceManager |
| Link | System : : Layer : : SubNetworkResourceManager | System : : Layer : : SubNetwork : : Link : ResourceManager |

UPDATE

| RDN OF RM | NAME OF PARENT RM | FULL NAME OF RM |
|---|---|---|
| System | : | System : ResourceManager |
| Admin | System : ResourceManager | System : : Admin : ResourceManager |
| NewRM | System : : Admin : ResourceManager | System : : Admin : : NewRM : ResourceManager ☆ ADDED |
| Layer | Layer : ResourceManager | System : : Layer : ResourceManager |
| SubNetwork | System : : Layer : Resourcemanager | System : : Layer : : SubNetwork : ResourceManager |
| Node | System : : Layer : : SubNetworkResourceManager | System : : Layer : : SubNetwork : : Node : ResourceManager |
| Link | System : : Layer : : SubNetworkResourceManager | System : : Layer : : SubNetwork : : Link : ResourceManager |

FIG. 29

OBJECT MANAGEMENT SYSTEM AND DATA PROCESSING SYSTEM WITH CENTRALIZED MECHANISM FOR MANAGING CONTAINMENT RELATIONSHIPS AMONG OBJECTS

BACKGROUND OF THE INVENTION

1. Field of the Invention

The present invention relates to an object management system, a data processing system, a computer-readable medium containing an object management program, and a computer-readable medium containing a data processing program. More Particularly, the present invention relates to an object management system which manages relationships among objects constituting a network system, by using a hierarchical containment tree model. The present invention also relates to a data processing system which operates with objects being organized in a hierarchical structure. The present invention further relates to a computer-readable medium containing an object management program or data processing program designed to cause a computer system to function as the above object management system or data processing system.

2. Description of the Related Art

Telecommunication Management Network (TMN), a standard developed by the International Telecommunication Union Telecommunication standardization sector (ITU-T), provides a common framework for management of a distributed environment where a plurality of networks are interconnected. This ITU-T recommendation uses layered containment tree models to describe the relationships among objects that constitute a system to be managed. Typical TMN applications may include network management systems (NMS) which manage nodes on a synchronous digital hierarchy (SDH) network, for example.

FIG. 41 is a block diagram of a conventional network management system, where two client applications 1100 and 1200 are allowed to make access to shared resources. The two client applications 1100 and 1200 have their own message processors 1110 and 1210 and tree managers 1120 and 1220, respectively. The message processors 1110 and 1210 transmit and receive messages to/from a plurality of resource management objects, or resource managers (RMs) 1131 to 1136, through an interface 1141. Those resource managers 1131 to 1136 control creation and deletion of managed objects (MOs) 1131a to 1136a which execute various processes necessary for operating the network system. Tables 1121 and 1221 in the tree managers 1120 and 1220 provide the message processors 1110 and 1210 with necessary data for resource management (S311 and S321). Based on the retrieved data, the message processors 1110 and 1210 make access to relevant resource management objects 1131 to 1136 to perform desired operations and receive their results (S312 and S322).

The tree managers 1120 and 1220 are responsible for maintaining containment trees 1122 and 1222 which describe the relationships among objects. To this end, each of the tree managers 1120 and 1220 has a resource management information base (RMIB), which is held in the aforementioned tables 1121 and 1221 in a fixed manner. The containment trees 1122 and 1222, produced from such table data, are used to manage communication address information to reach the resource managers 1131 to 1136. Note that, in the prior-art system, the client applications 1100 and 1200 manage their own containment trees 1122 and 1222 independently. When the system is started up or shut down, the resource managers 1131 to 1136 notify both tree managers 1120 and 1220 of creation or deletion of objects (S313 and S323).

The client applications 1100 and 1200 can grasp the relationships among objects by making access to RMIB maintained in their local tables 1121 and 1221. In the prior-art system, however, it is hard to change the containment tree structure since each client application has its own RMIB in a fixed manner. That is, the relationships among objects are determined at the system design phase and client applications include such object relationships when they are developed. Once the system is established in such a way, it is not allowed, basically, to change the containment tree structure to add or remove some resource managers. This means that a large amount of work is necessary to modify the client applications to implement a change in the containment tree.

Again, a plurality of client applications keep their own containment trees, meaning that there exist a plurality of containment trees in a system. To maintain their consistency, resource managers are required to exchange messages to/from those client applications. As client applications and resource managers increase in number, the frequency of their interactions would be raised, thus causing a problem in information traffic.

SUMMARY OF THE INVENTION

Taking the above into consideration, an object of the present invention is to provide an object management system which allows the relationships among resource managers to be modified without affecting client applications, and also reduces the amount of information exchanged for object management operations.

Further, it is another object of the present invention to provide a data processing system which allows the relationships among resource managers to be changed without affecting client applications, and also reduces the amount of information exchanged for management operations.

To accomplish the first object note above, according to the present invention, there is provided an object management system which manages the relationships among resource managers that control managed objects by using a hierarchical containment tree model. This system comprises the following elements: a message processor which receives an operation request directed toward one of the resource managers; a tree manager which maintains tree structure data that defines containment relationships among the resource managers, together with identification data that is used to distinguish between the resource managers; and an object manager which examines the tree structure data maintained in the tree manager to find the identification data of a destination resource manager for which the received operation request should be destined, and sends the operation request to the destination resource manager.

To accomplish the second object of the present invention, there is provided a data processing system for managing relationships among a plurality of objects by using a hierarchical containment tree model. This system comprises the following elements: a message processor which receives an operation request directed toward one of the resource managers; a tree manager which maintains tree structure data that defines containment relationships among the resource managers, together with identification data that is used to distinguish between the resource managers; and an object manager which examines the tree structure data maintained in the tree manager to find the identification data of a destination resource manager for which the received operation request should be destined, and sends the operation request to the destination resource manager.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram which shows an example of RMIB stored in a database;

FIG. 5 is a diagram which shows an example of table data;

FIG. 6 is a diagram which shows a table in which object IDs are registered;

FIG. 9 is a diagram which shows the resultant change in the table entries;

FIG. 25 is a diagram which shows RMIB data describing the containment tree structure of FIG. 24;

FIG. 27 is a diagram which shows the resultant table data held in a tree manager;

FIG. 29 is a diagram which shows updated RMIB data including the new RM entry;

DESCRIPTION OF THE PREFERRED EMBODIMENTS

Preferred embodiments of the present invention will be described below with reference to the accompanying drawings.

Figure 1:
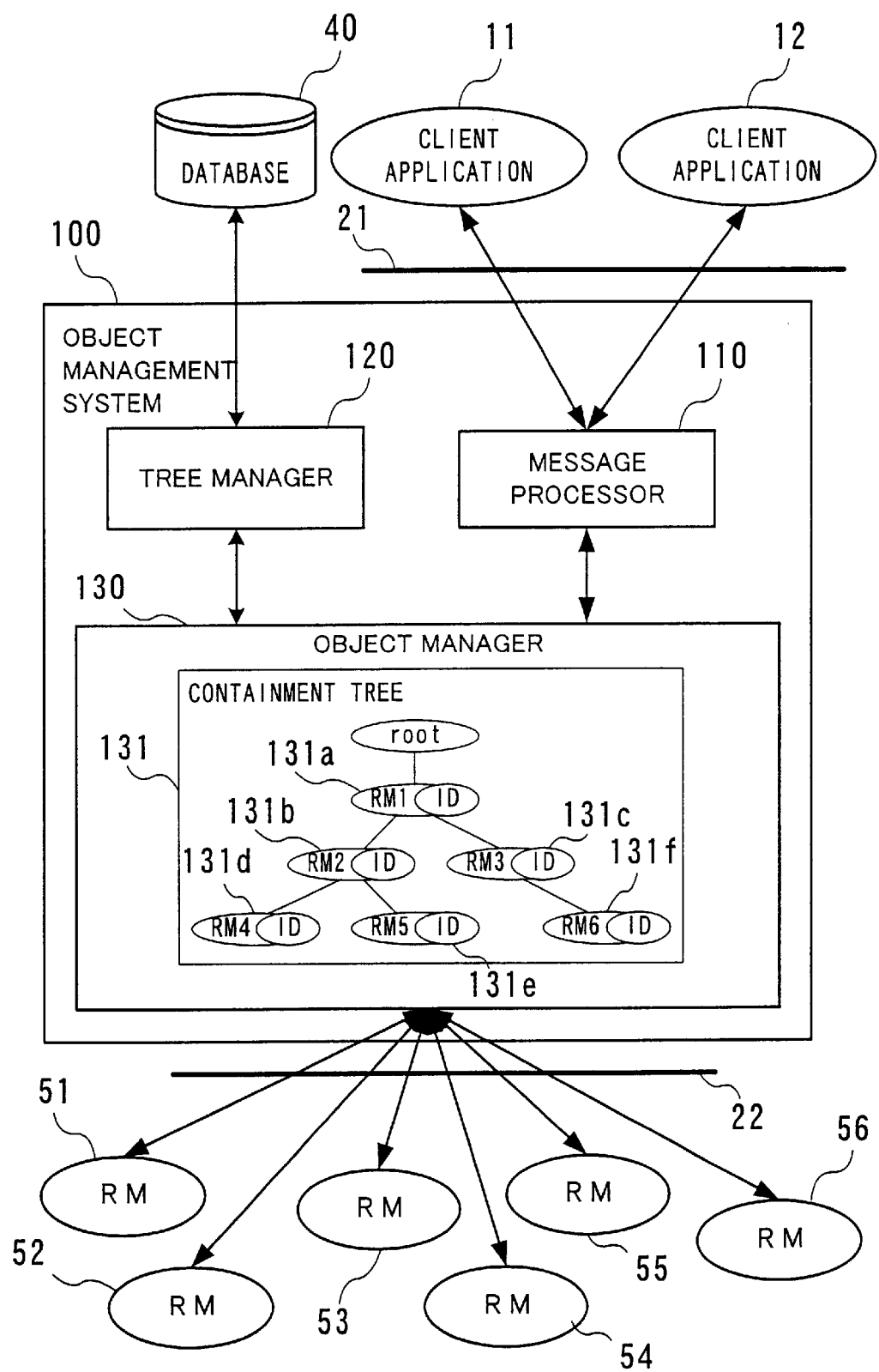
FIG. 1 is a conceptual view of the present invention.

FIG. 1 is a conceptual view of an object management system according to the present invention. This object management system 100 serves for a plurality of client applications 11 and 12 through an interface 21, while being connected to a plurality of resource managers (RMs) 51 to 56. While not shown in FIG. 1, the RMs 51 to 56 administrate their respective managed objects (MOs), which provide the client applications 11 and 12 with various processing services on request. The individual RMs 51 to 56 are assigned their relative distinguished names (RDNS) "RM1" to "RM6," respectively. Those RMs 51 to 56 are associated with each other, and their logical relationships can be represented in a containment tree model.

The object management system 100 comprises a message processor 110, a tree manager 120 and an object manager 130. The message processor 110 accepts operation request messages that the client applications 11 and 12 issue to transact with the RMs 51 to 56, and it passes them to the object manager 130. The tree manager 120 makes access to the database 40 to obtain tree structure data that defines the above-noted containment relationships among the RMs 51 to 56. Besides managing such tree structure data in the database 40, the tree manager 120 also manages identification data of the RMs 51 to 56. This identification data is used to distinguish between the individual RMs 51 to 56.

The object manager 130 grasps the containment relationships of RMs in the form of a containment tree 131, referring to the tree structure data maintained in the tree manager 120. The containment tree 131 is constructed by a plurality of node objects 131a to 131f corresponding to the RMs 51 to 56 and links interconnecting them. Each node object holds naming information of an RM and corresponding identification data (ID) as will be described later. For every operation request message received by the message processor 110, the object manager 130 consults the containment tree 131 to obtain the identification data of a relevant RM. Identifying the right destinations by the identification data, the message processor 110 transmits the messages to their relevant RMs.

The above object management mechanism permits the client applications 11 and 12 to send operation request messages, without managing for themselves the containment tree structure of RMs. As a result, resource management objects can be easily added or deleted to/from the system environment, because any changes in the containment relationships of RMs would not affect client applications, but can be managed within the tree structure data held in the tree manager 120. Another advantage of the proposed system is that it reduces the messages exchanged for manipulating the RMs 51 to 56, and thus improves the total system performance.

The next section will now explain various processes and transactions to be performed in the proposed object management system 100.

Figure 2:
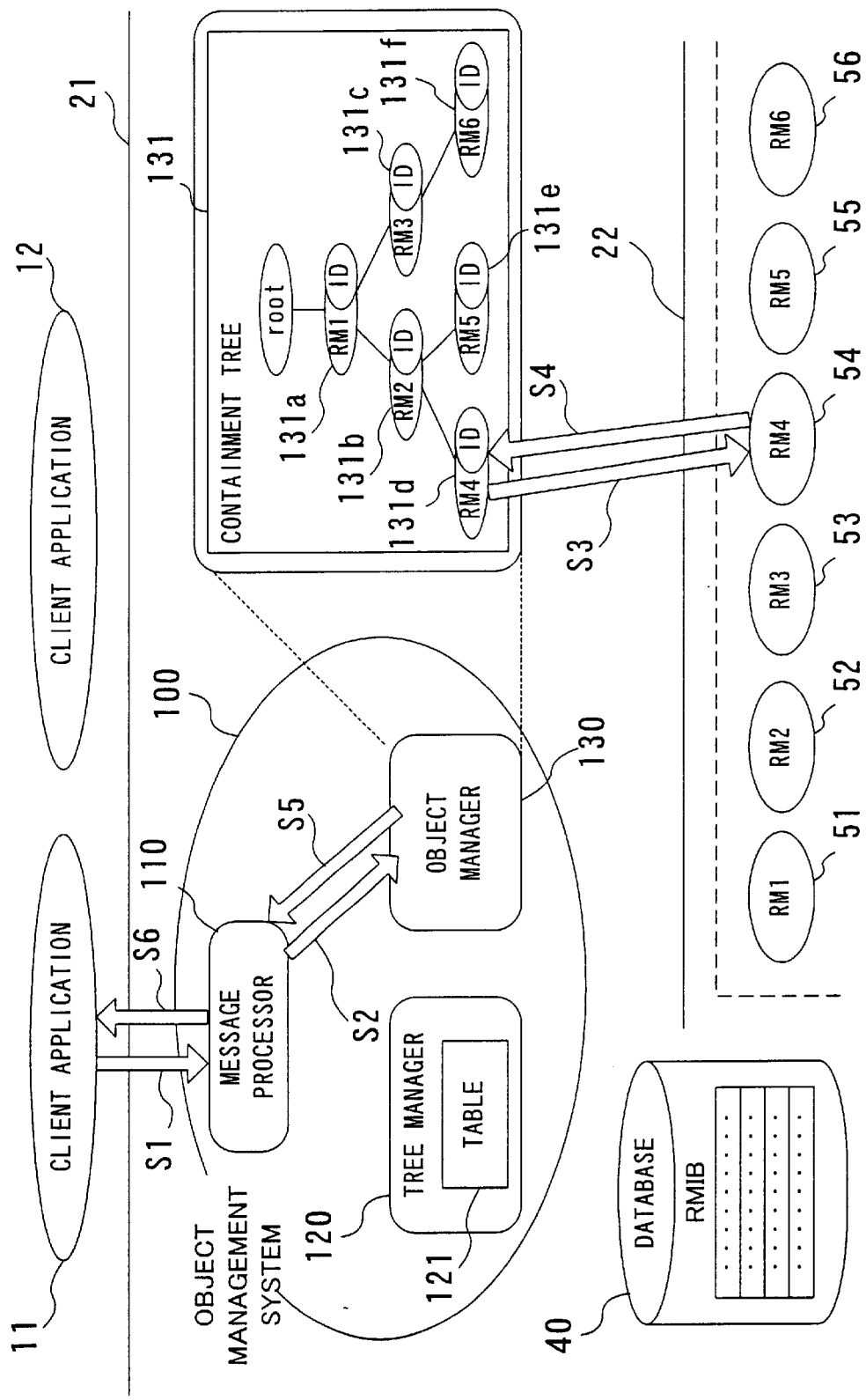
FIG. 2 is a diagram which shows a transaction between a client application and a resource manager.

FIG. 2 shows an example of transactions between client applications and resource managers. More specifically, FIG. 2 shows such a situation where the client application 11 attempts to manipulate a specific RM 54. A transaction starts with an operation request message issued by the client application 11 toward the RM 54. This message is delivered to the object management system 100 through the interface 21, thus reaching its message processor 110 (Step S1). The message processor 110 passes this request to the object manager 130 (Step S2). The object manager 130 identifies the RM 54, finding a relevant node object 131d in the containment tree 131, and sends the operation request to the RM 54 (Step S3).

After performing the requested operation, the RM 54 returns a response message to the object manager 130 to report the result of the operation (Step S4). The object manager 130 receives and processes this response message, searching again the containment tree 131 to identify the node object 131d. Recognizing it as a response from the RM 54, the object manager 130 passes the message to the message processor 110 (Step S5). Finally, the message processor 110 returns the response message to the client application 11 for completion notification (Step S6). In this way, the client applications can ask RMs to perform desired operations without the need to manage their own containment trees.

Figure 3:
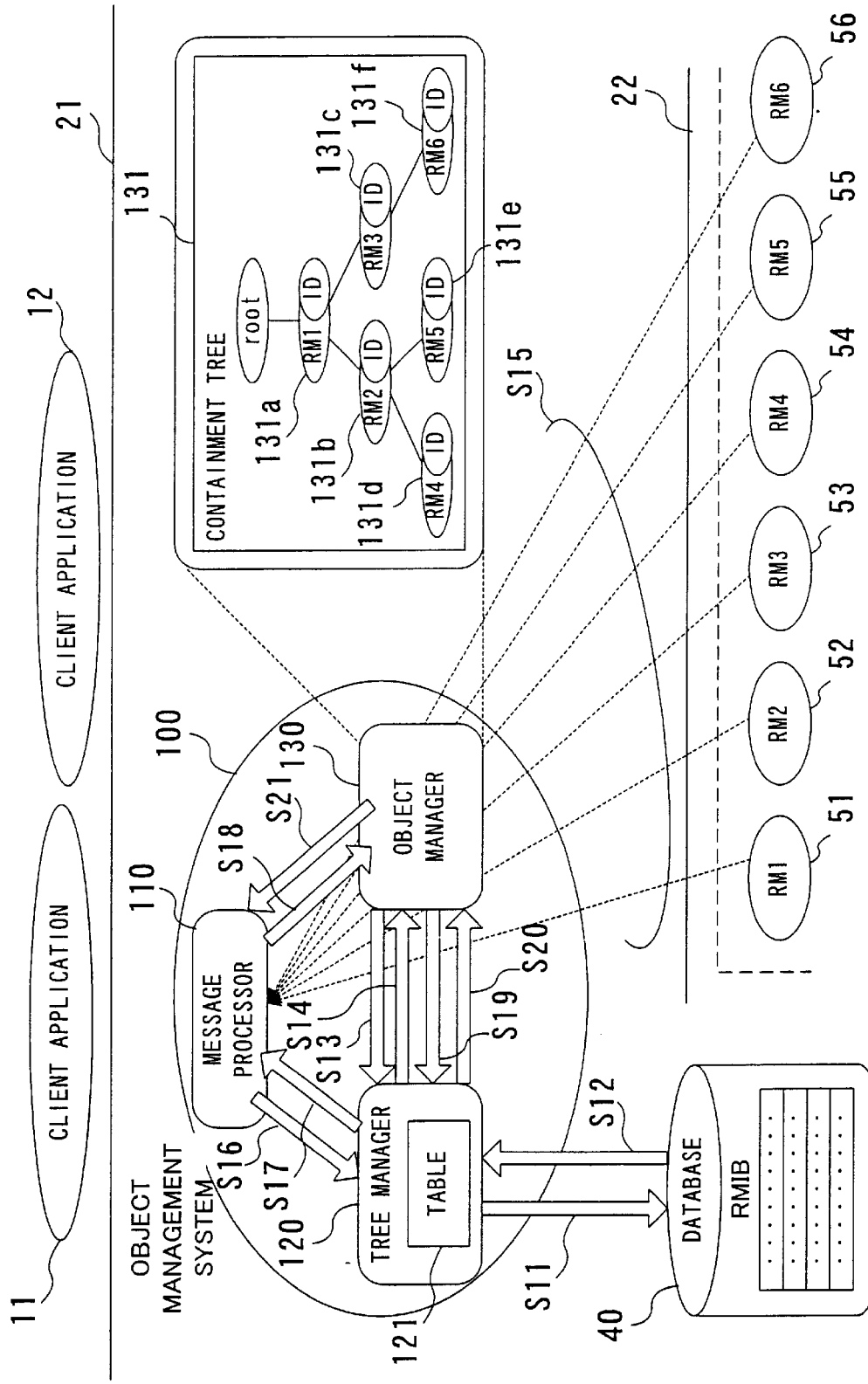
FIG. 3 is a diagram which shows a process to build a containment tree.

Referring next to FIG. 3, a process to build a containment tree will be described below. As mentioned earlier, a resource management information base (RMIB) is constructed in the database 40 to define tree structure data representing containment relationships (i.e., hierarchical associations between parent objects and child objects) among RMs. The tree manager 120 requests this RMIB data when the system starts up (Step S11), and the database 40 supplies it in response to the request (Step S12). The tree manager 120 holds this RMIB in the form of a table 121.

FIG. 4 shows an example of RMIB data registered in the database 40. Each entry of this RMIB contains the following data items: "Relative Distinguished Name (RDN) of RM," "Name of Parent RM," and "Full Name of RM." The first item "Relative Distinguished Name of RM" is the relative distinguished name (RDN) of each individual RM, while the second item "Name of Parent RM" shows the distinguished name (DN) of its parent RM (i.e., a higher-level RM object located immediately above the RM of interest within a containment tree structure). The third item "Full Name of RM" means the unique name of the RM itself, which consists of: the relative distinguished names of all its ancestors lying on the path from the root to its parent RM, its own relative distinguished name, and an attribute indicating primary functions of the RM.

The tree manager 120 retrieves such RMIB data from the database 40 and formulates a table 121 shown in FIG. 5. In this example table data of FIG. 5, each entry contains the following four data items: "Relative Distinguished Name (RDN) of RM," "Name of Parent RM," "Name of Node Object," and "Object ID Information." The first item "Relative Distinguished Name of RM" is the relative distinguished name of each individual RM, while the second item "Name of Parent RM" shows the distinguished name of its parent RM. The third item "Name of Node Object" shows a distinguished name that is assigned to a corresponding node object in the containment tree, which is actually the same as what is registered in the RMIB as a "Name of RM," i.e., the RM's distinguished name. The last item "Object ID Information" is for registration of an identifier (ID) used to distinguish each RM from others when sending or receiving request messages within the system. The table data fields of "Object ID Information" are blank at this initial set-up stage. The tree manager 120 creates and holds such a table 121 as cache storage to eliminate the need for frequent access to the database 40. From this local table 120, the containment tree of RMs can be constructed and initialized easily, as will be described below.

Referring back to FIG. 3, the object manager 130 requests the tree manager 120 to read out tree structure data from the above-described table 121 (Step S13) and receives a response to it (Step S14). On the basis of the received tree structure data, the object manager 130 builds a containment tree 131. The message processor 110 is now ready to accept object ID registration messages from the RMs 51 to 56. When such a message is received (Step S15), the message processor 110 asks the tree manager 120 to register the received object ID information (Step S16). In response to this, the tree manager 120 enters a record of the object ID information to a relevant field of the table 121, and then sends a completion notification back to the message processor 110 (Step S17). As a result of the above steps, the table 121 in the tree manager 120 is completed as shown in FIG. 6. Note that each entry of the table 121 now has a registered field value of the "Object ID Information."

The message processor 110 now sends a request to the object manager 130 to retrieve the collected object ID information (Step S18). The object manager 130 then directs the tree manager 120 to read out the object ID information from the table 121 (Step S19) and receives a response from the tree manager 120, thus obtaining object ID information of each RM (Step S20). Finally, the object manager 130 notifies the message processor 110 that it has obtained the registered object ID information (Step S21). In this way, the containment tree 131 is created in the object manager 130, in which individual RMs are represented as object nodes 131a to 131f with registered object ID information.

Figure 7:
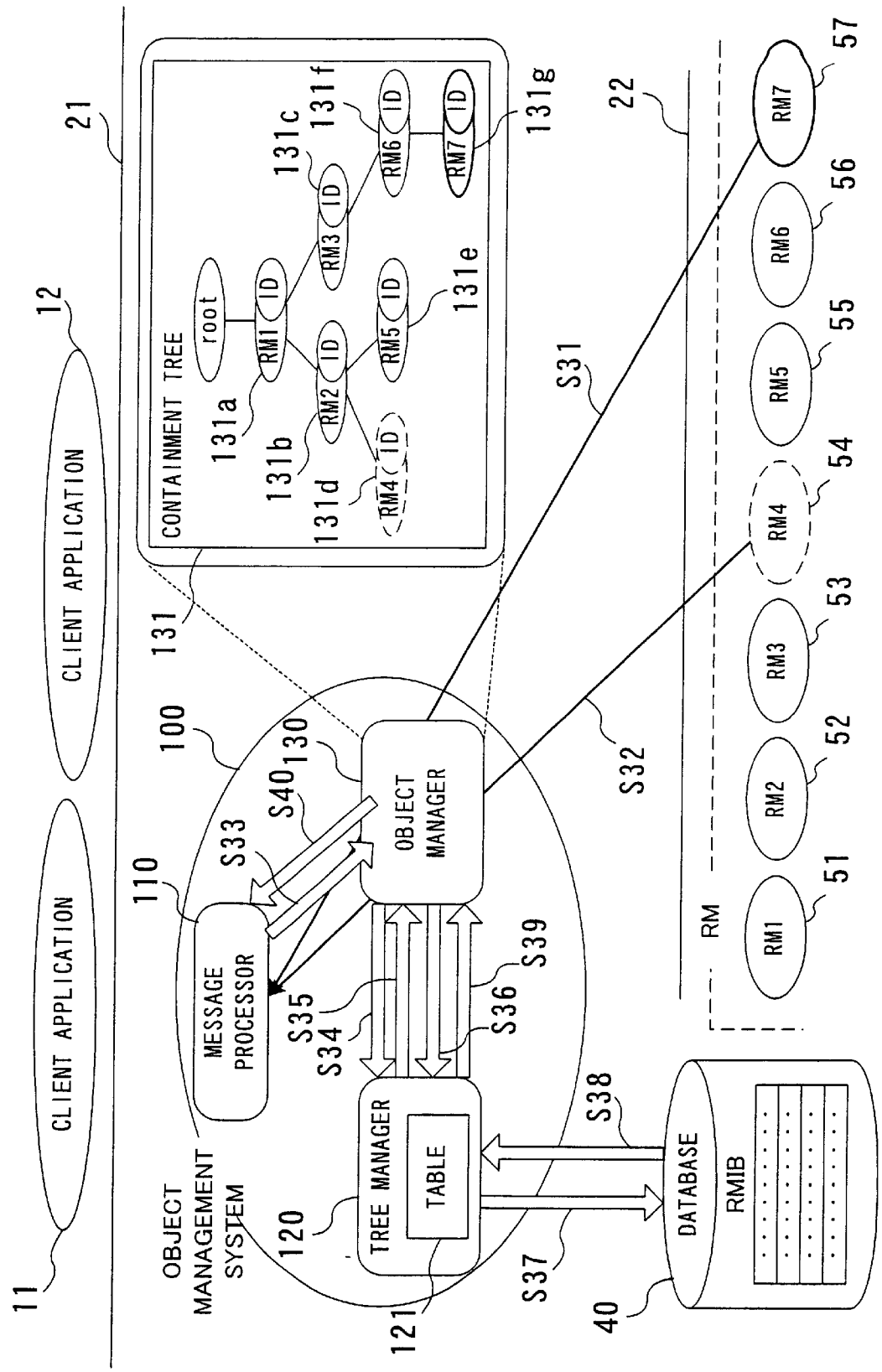
FIG. 7 is a diagram which shows a process to create and delete resource managers.
Figure 8:
FIG. 8 is a diagram which shows a change in the database caused by RMIB updating operations.

Referring next to FIG. 7, a process to create and delete resource management objects will be described below. FIG. 7 shows such an example situation where an RM 57 having a relative distinguished name "RM7" is to be newly created, and at the same time, the existing RM 54 is to be deleted. The RM 57, when created, sends an RM creation indication message to the message processor 110 (Step S31). On the other hand, the RM 54, which is now leaving the system, sends an RM deletion indication message to the message processor 110 (Step S32). Upon receipt of those messages, the message processor 110 requests the object manager 130 to update its tree structure data (Step S33). In response to this request, the object manager 130 first sends some query messages to the tree manager 120 (Step S34) before executing updates. The tree manager 120 is designed to check the current RM entries as follows. That is, when creating a new RM, the tree manager 120 tests the presence of an object that would be the RM's parent. When removing an existing RM from the tree, the tree manager 120 tests whether the RM in question really exists in the tree structure data, and if it is found, further tests whether the RM has its child RMs. The results of such tests are returned to the object manager 130 as the response to its queries (Step S35). After confirming the test results, the object manager 130 requests the tree manager 120 to update the tree structure data (Step S36). The tree manager 120 requests the database 40 to update the RMIB data. (Step S37) and receives a response to it (Step S38). FIG. 8 shows how the database 40 is changed by such RMIB update operations. Note that the record of the RM 54 with a relative distinguished name "RM4" is removed from the RMIB, while a new record with a relative distinguished name "RM7" is added to the RMIB.

According to the RMIB changes, the tree manager 120 further updates its local table 121 and returns a response to the object manager 130, indicating that the requested update operation has successfully finished (Step S39). FIG. 9 shows the resultant changes in the table entries. Similar to the above-noted RMIB update, the entry with a relative distinguished name "RM4" is removed from the table, and a new entry with a relative distinguished name "RM7" is added to the table. The object manager 130 further updates its containment tree 131 and returns a response to the message processor 110 (Step S40). In this way, the tree structure data is automatically updated without affecting the client applications 11 and 12 at all.

Figure 10:
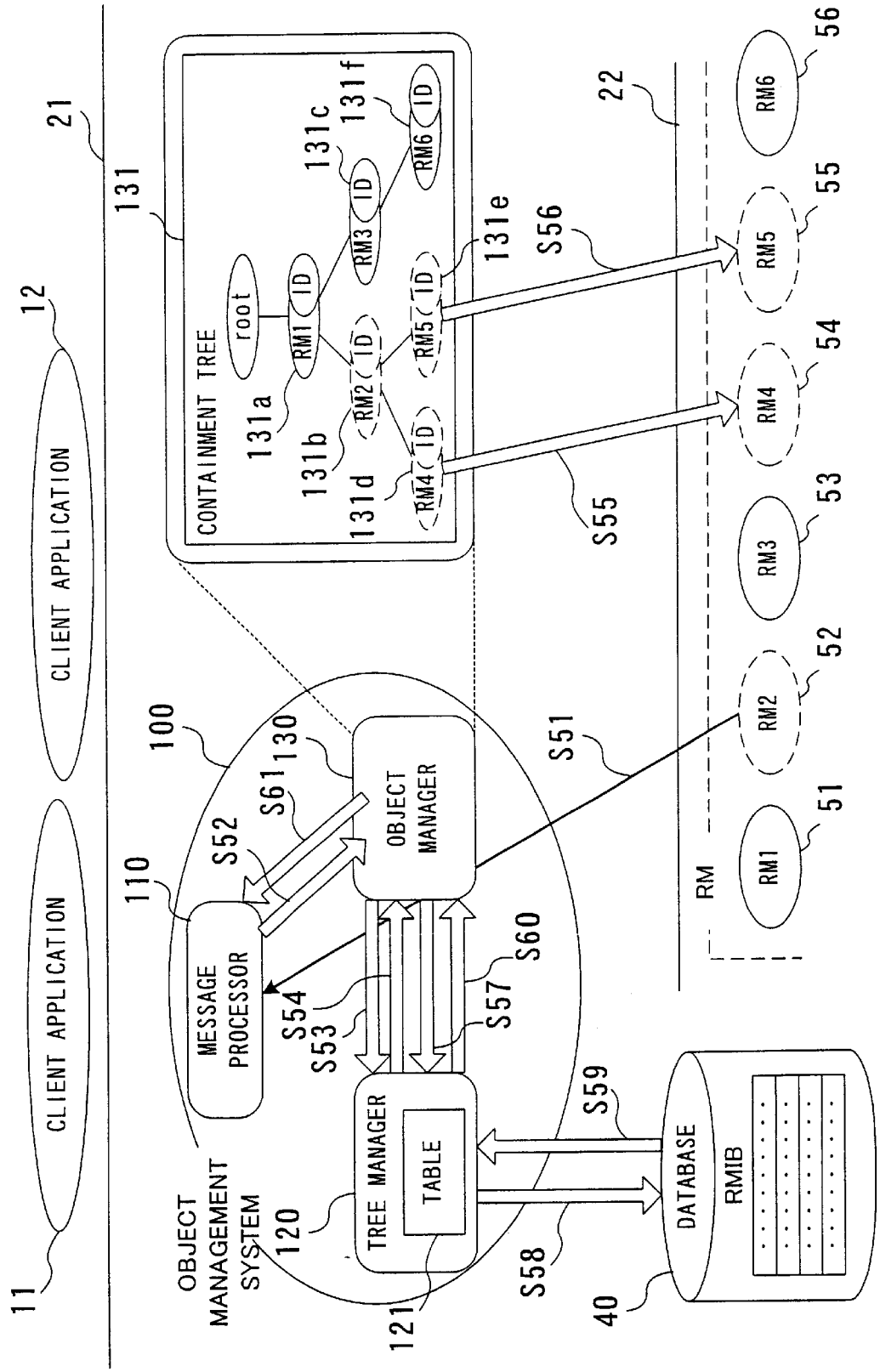
FIG. 10 is a diagram which shows a process to delete a resource manager having child objects.

Referring now to FIG. 10, the next section will describe a process to delete a resource management object having child objects. FIG. 10 shows a specific situation where the RM 52 with a relative distinguished name "RM2" is to be removed. At the outset of this RM deletion process, the RM 52 notifies the message processor 110 that it is leaving (Step S51). Upon receipt of this notification, the message processor 110 requests the object manager 130 to update the tree structure data (Step S52). The object manager 130 then requests the tree manager 120 to read and check the tree structure data (Step S53). In response to this request, the tree manager 120 tests whether the tree structure data has an entry of the RM in question, and if there is a relevant entry, it further tests whether the RM has its child RM(s). The results of those tests are sent back to the object manager 130 as a response to the above request (Step S54).

Figure 11:
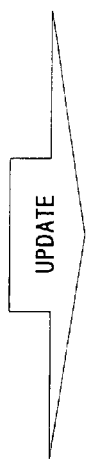
FIG. 11 is a diagram which shows how the RMIB is updated.

In the present example, the RM 52 has two child RMs 54 and 55 as shown in the containment tree 131. Receiving the test results from the tree manager 120, the object manager 130 directs those child RMs 54 and 55 to delete themselves (Steps S55 and S56) and then requests the tree manager 120 to update the tree structure data accordingly (Step S57). Upon receipt of this tree data update request, the tree manager 120 requests the database 40 to update the RMIB (Step S58) and receives a response to it (Step S59). FIG. 11 shows how the RMIB is changed. Note that the records of two RMs named "RM4" and "RM5" have disappeared from the RMIB, as well as their parent RM named "RM2."

Figure 12:
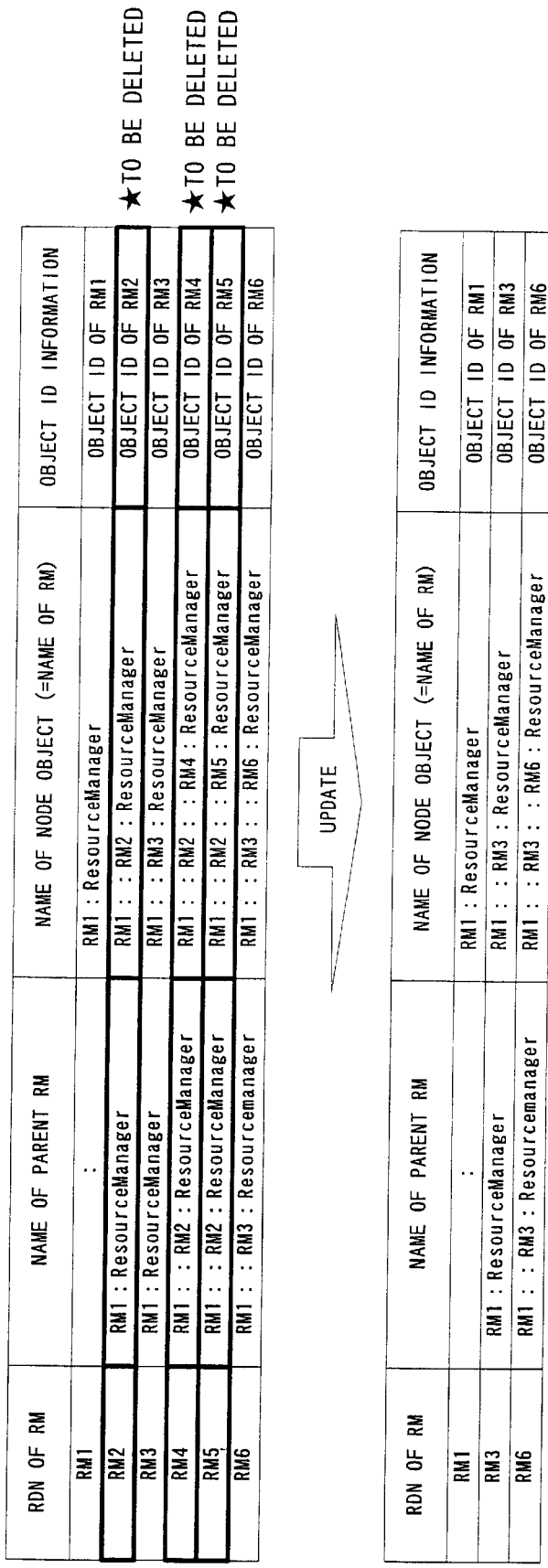
FIG. 12 is a diagram which shows the resultant change in the table entries.

Upon receipt of the response from the database 40, the tree manager 120 updates its local table 121. FIG. 12 shows the resultant change in the table entries, where the parent and child RMs named "RM2," "RM4," and "RM5" are all removed from the table 121. This result is consistent with what happened to the RMIB.

Now that the table 121 is refreshed, the tree manager 120 notifies the object manager 130 of the completion of update (Step S60). Upon receipt of this notification, the object manager 130 removes from the containment tree 131 the existing node objects 131b, 131d, and 131e, corresponding to the deleted RMs 52, 54, and 55, respectively. The removal of node objects are conducted from lower levels to higher levels. In the present example of FIG. 10, the node object 131d is deleted first, followed by 131e and 131b. When the containment tree 131 is successfully updated, the object manager 130 returns a completion notification to the message processor 110 (Step S61). By deleting all child RMs together with their parent RM, the table 121 and containment tree 131 are optimized so that they include no obsolete records.

Figure 13:
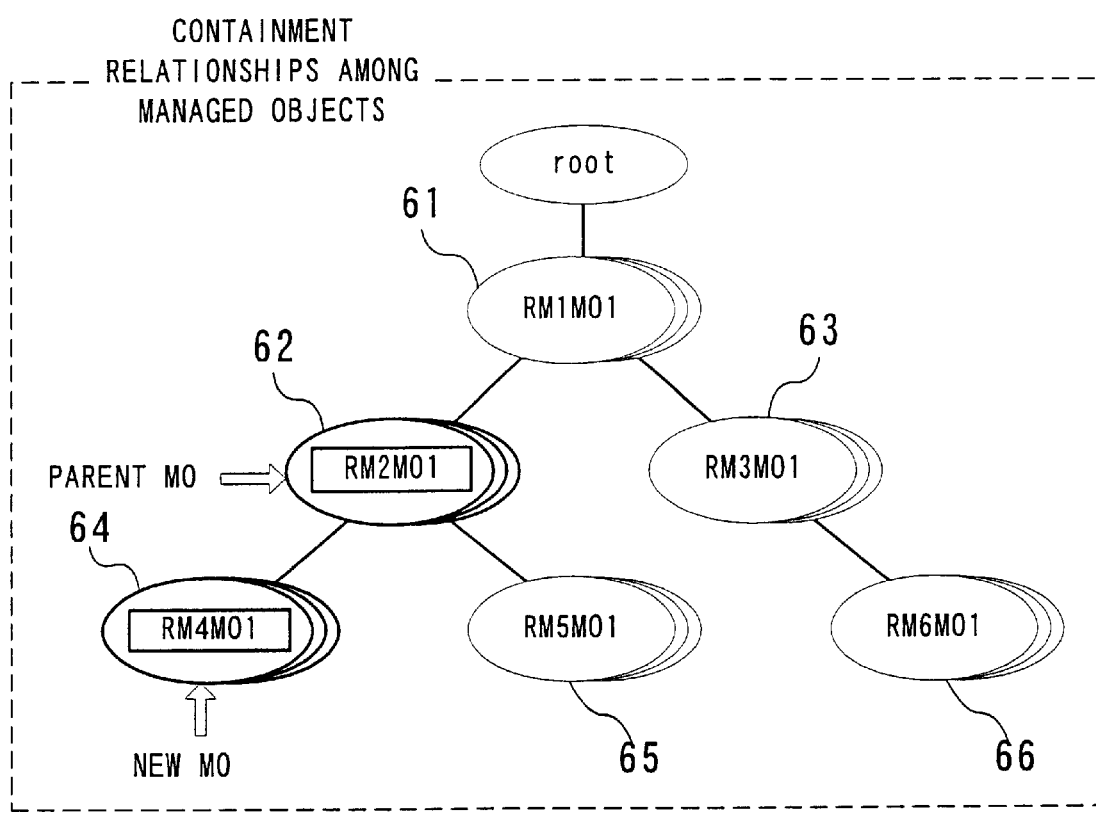
FIG. 13 is a diagram which shows an example of containment relationships among managed objects that are governed by a resource manager.
Figure 14:
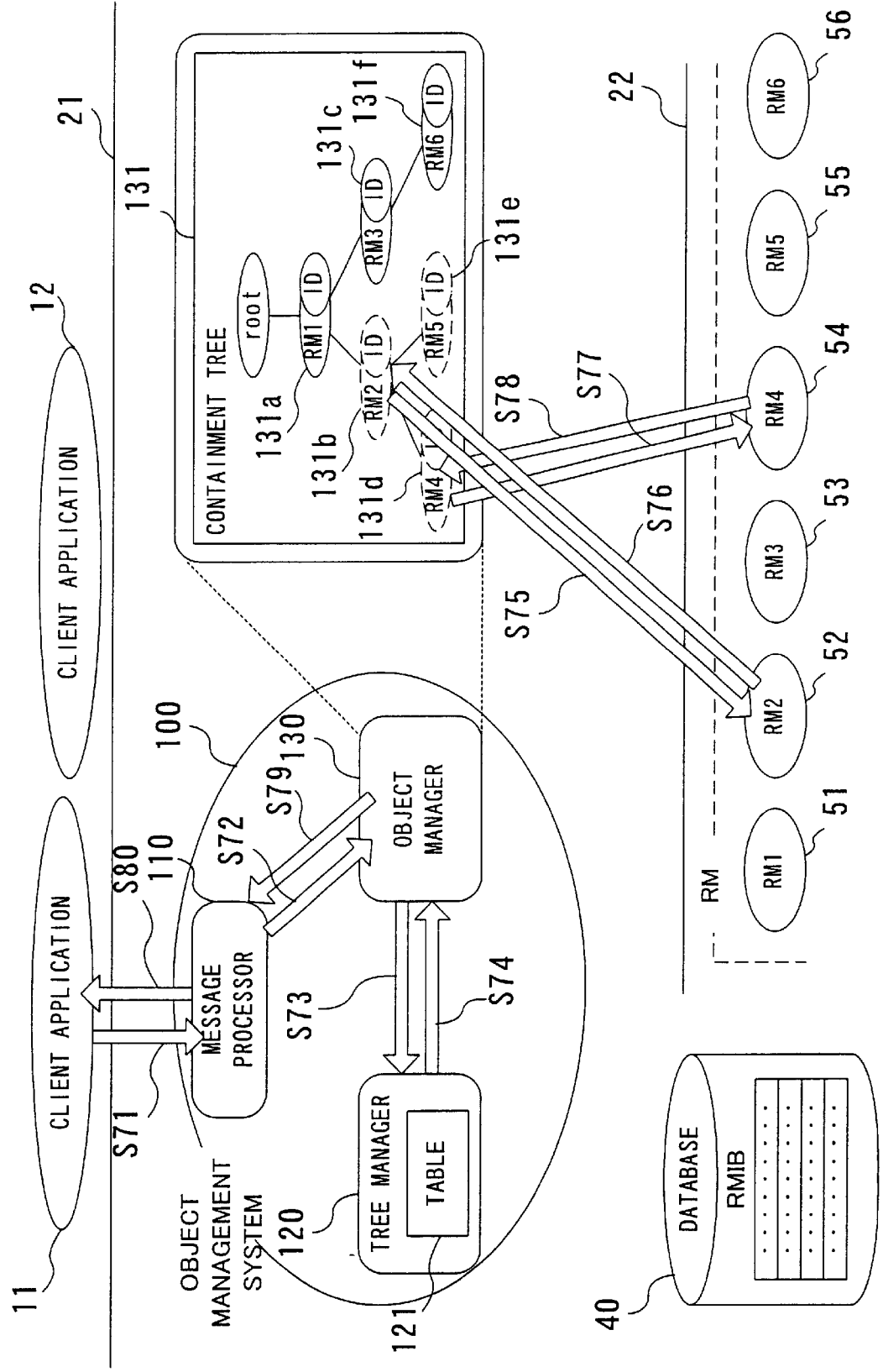
FIG. 14 is a diagram which shows a process to create a new managed object.
Figure 15:
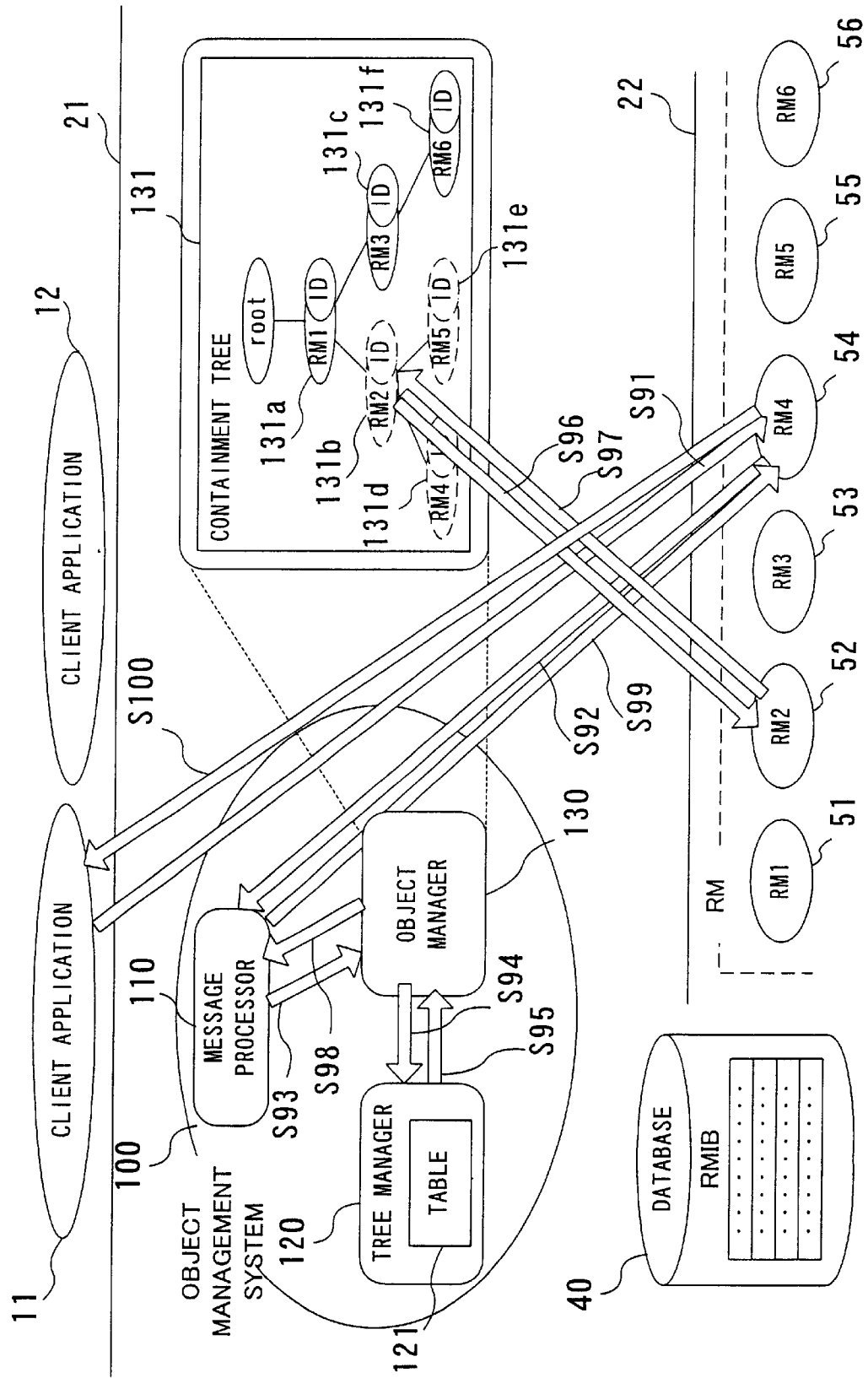
FIG. 15 is a diagram which shows a process to be executed when a client application has directly requested a resource manager to create a new managed object.

Referring now to FIGS. 13 to 15, a process to create new managed objects (MOs) will be described below. For illustrative purposes, consider that an MO will be created under the management of the RM 54.

FIG. 13 shows an example of containment relationships among MOs being controlled by the RMs. As the RMs 51 to 56 form the containment tree structure 131, like hierarchical relationships are established among corresponding managed objects (MOs) 61 to 66. Relative distinguished names assigned to these MOs 61 to 66 are: "RM1MO1," "RM2MO1," "RM3MO1," "RM4MO1," "RM5MO1," and "RM6MO1." Each MO is uniquely identified by a concatenation of relative distinguished names of all its ancestors and that of the MO itself. In the present example, an object creation request will be issued in order to create a new instance of the MO 64, which is under the management of the RM 54. This MO 64 is identified by its distinguished name "RM1:RM1MO1:RM2:RM2MO1:RM4:RM4MO1," while its parent MO 62 by "RM1:RM1MO1:RM2:RM2MO1."

FIG. 14 shows how a new MO is created. The process is initiated by an object creation request for a new instance of MO 64. This request is sent from the client application 11 to the message processor 110 (Step S71). Upon receipt of such a request, the message processor 110 demands the object manager 130 to create the requested MO 64 under the RM 54 (Step S72). The object manager 130 then requests the tree manager 120 to test whether the RM 54 has a parent resource manager (RM 52 in this case) in the containment tree 131 (Step S73). The tree manager 120 performs this test and returns the result to the object manager 130 (Step S74). If the parent RM 52 is found, the object manager 130 then asks the RM 52 to check the presence of a corresponding MO 62, which is the parent of the MO 64 (Step S75). The RM 52 checks whether the parent MO 62 is present, and returns the result to the object manager 130 (Step S76). If the parent MO 62 is present, the object manager 130 requests the RM 54 to create a new instance of the MO 64 (Step S77). In response to this request, the RM 54 creates the MO 64 and returns the result to the object manager 130 (Step S78). Now that the object manager 130 has finished all the required tasks for creating the MO 64, it returns the result to the message processor 110 (Step S79). Finally, the message processor 110 sends the result to the client application 11, thus finishing the process (Step S80).

If no parent MO is found in step S76, the object manager 130 returns an error message to the client application 11 without creating the MO 64. Since it checks the presence of a relevant parent MO before creating a new MO, the proposed object management system 100 never produces any inoperable MOs.

Referring next to FIG. 15, another process of creating a new MO will be described below. In this alternative case, a client application produces an MO through a direct interaction with its related RM. More specifically, the client application 11 sends a request message directly to the RM 54 in order to create an MO 64. The RM 54, however, does not create it immediately. Instead, the RM 54 sends a query message to the object management system 100 to ask whether the requested MO 64 has a parent MO (Step S92). The message processor 110 receives and forwards this query message to the object manager 130 (Step S93). The object manager 130 then requests the tree manager 120 to check whether the parent MO in question is in the registered tree structure data (Step S94), and receives the result from the tree manager 120 (Step S95).

If the parent RM is found, the object manager 130 then asks the parent RM to test the presence of its associated MO, which must be the parent MO of the MO 64 to be created (Step S96), and it receives a response from the object manager 130 (Step S97). In the context of FIG. 15, the RM 52 and its related MO 62 are the parent RM and parent MO in question. The object manager 130 notifies the message processor 110 of such a test result (Step S98) The message processor 110 forwards the result to the RM 54 (Step S99) as a response message to the query that it received at step S92. When the presence of a parent MO is confirmed, the RM 54 creates a new instance of the MO 64 and informs the client application 11 of the successful result of this MO creation process (Step S100). In this way, the object management system 100 protects the MO tree structure data against any discrepancies which could be introduced when creating new member MOs.

Figure 16:
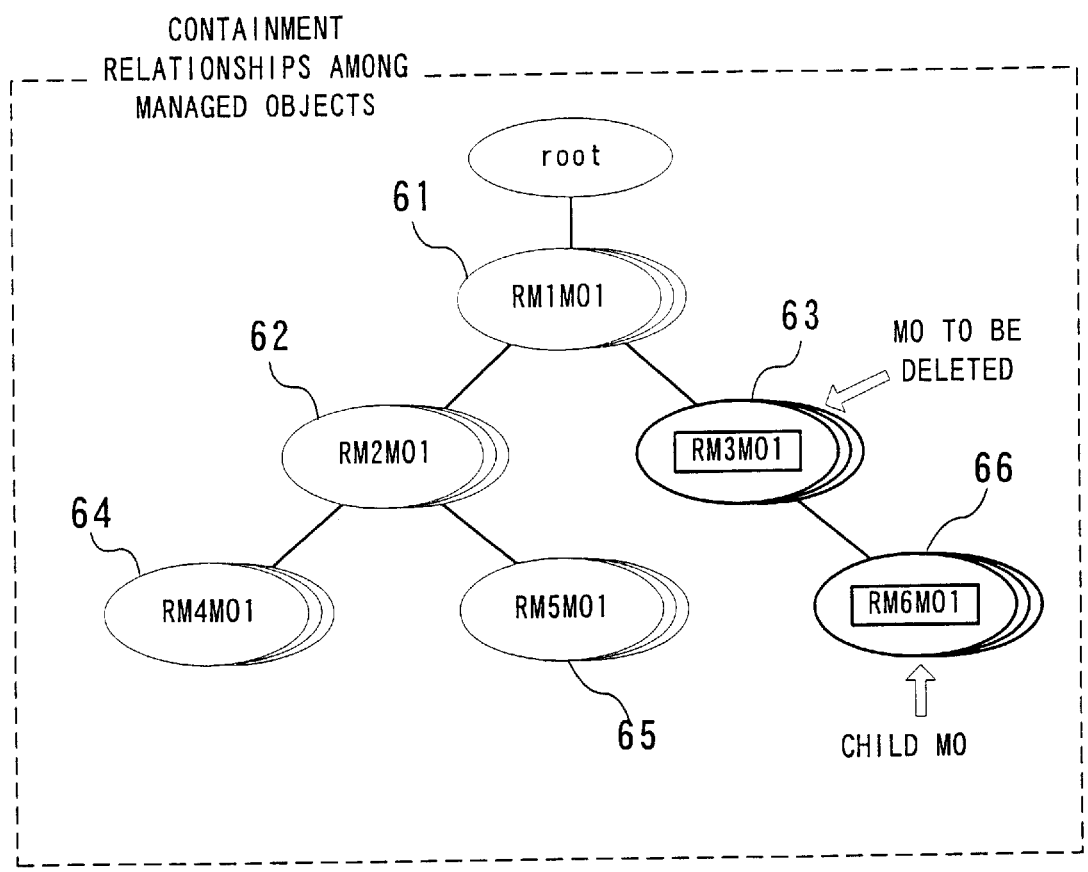
FIG. 16 is a diagram showing the location of a managed object which will be deleted from the containment tree.
Figure 17:
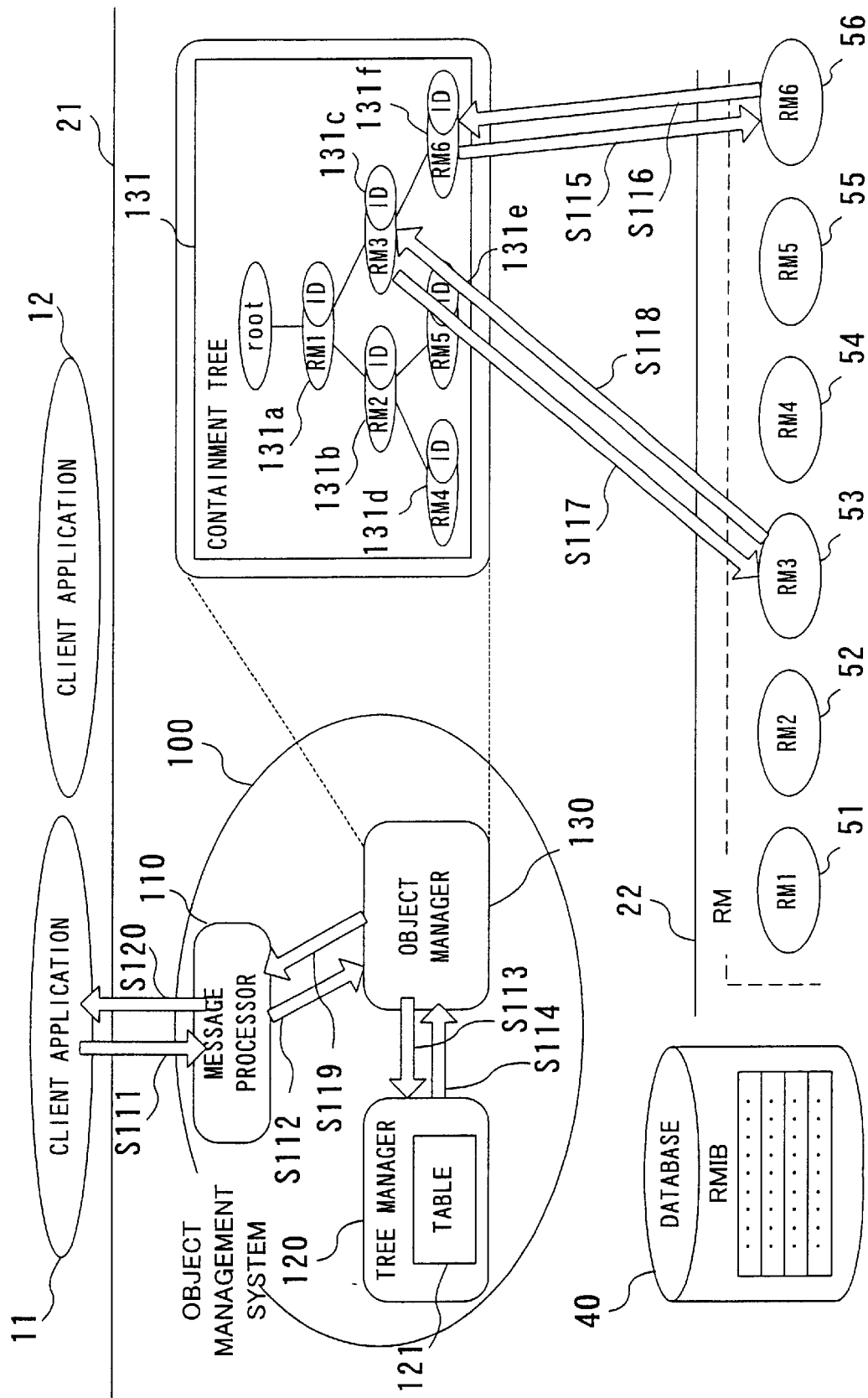
FIG. 17 is a diagram which shows a process to delete the managed object noted in FIG. 16.

Referring next to FIGS. 16 and 17, a process to delete existing MOs will be described below. For illustrative purposes, it will be assumed that an MO 63 with a relative distinguished name "RM3MO1" is to be deleted. FIG. 16 shows the location of this MO 63 in the containment tree of MOs. Note that the MO 63 has a child MO 66. In such a case, the object management system 100 removes the MO 63 in the following way.

FIG. 17 shows a process to delete the MO 63, in which the client application 11 sends to the message processor 110 a request for removal of the MO 63 under the control of its associated RM 53 (Step S111). The message processor 110 forwards the request to the object manager 130 (Step S112). Receiving this MO deletion request, the object manager 130 asks the tree manager 120 to test whether any child RM is present in the containment tree 131 (Step S113). The object manager 130 then receives a response from the tree manager 120 (Step S114). In the present case, the RM 56 is contained in the RM 53. Accordingly, the object manager 130 requests the child RM 56 to delete its associated MO 66 (Step S115). After deleting the MO 66, the RM 56 returns a response message to notify the object manager 130 that the specified MO has been deleted (Step S116). Now that the child MO has been deleted, the object manager 130 then requests the RM 54 to delete its associated MO 63 (Step S117). After deleting the MO 63, the RM 53 sends a response message to notify the object manager 130 that the specified MO has been deleted (Step S118). The object manager 130 returns the above result to the message processor 110 (Step S119), and finally, the message processor 110 sends its response message back to the client application 11 to report the result (Step S120).

When requesting RMs to delete MOs as in steps S115 and S117, the object manager 130 specifies the distinguished names of the MOs to be deleted, such as "RM1:RM1MO1:RM3:RM3MO1." Based on this naming information, the RMs identify which MOs they should remove.

As described above, the proposed object management system 100 allows client applications to delete MOs without the need for having their local containment trees, while maintaining the consistency of their containment relationships.

The next section will explain an exclusive control mechanism to handle a plurality of operation requests being directed to each single RM. According to the present invention, the message processor 110 has message queues and service status flags for each individual resource manager to control incoming operation request messages from client applications.

Figure 18:
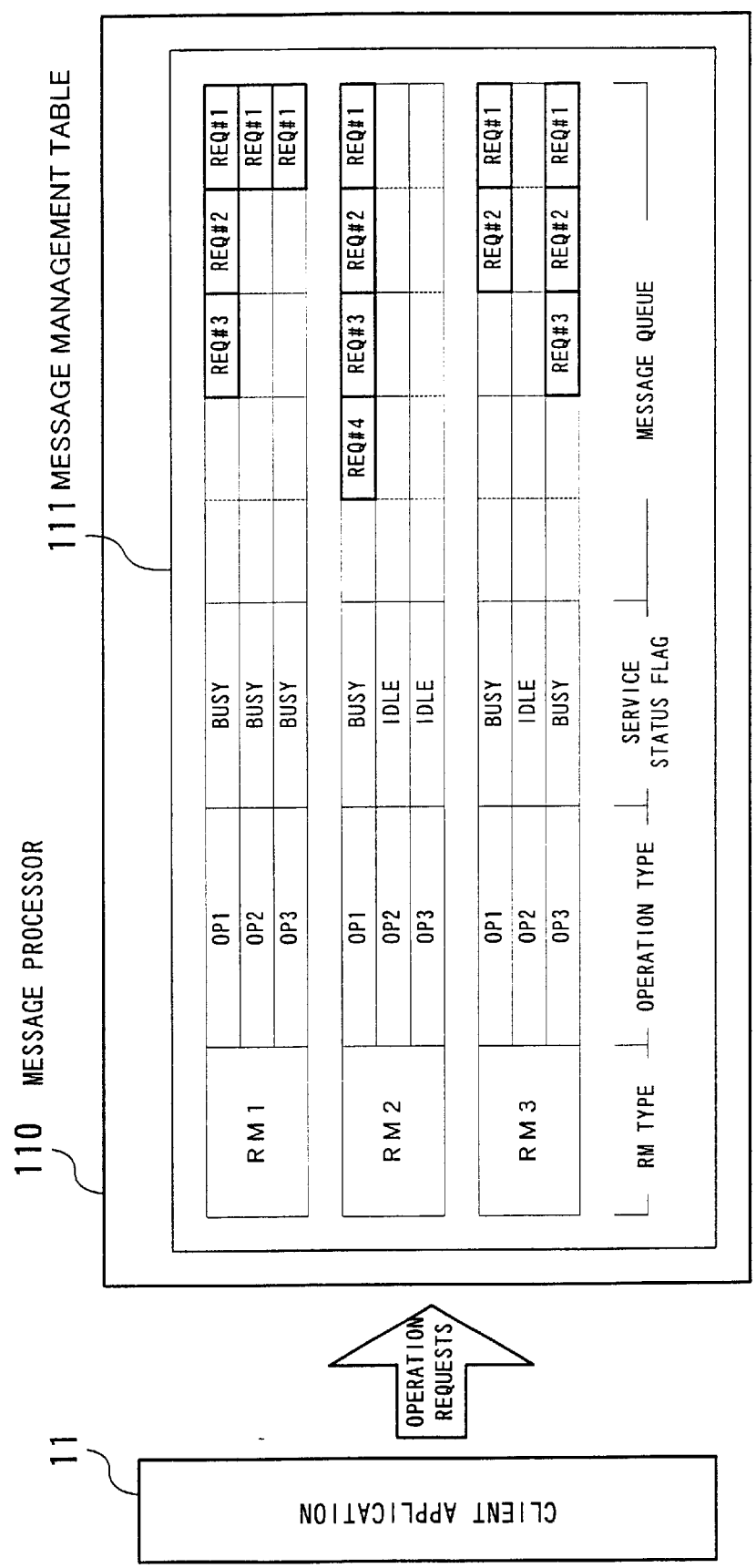
FIG. 18 is a diagram which shows an internal structure of a message processor.

FIG. 18 shows a message management table 111 disposed as integral part of the message processor 110. Recall that the message processor 110 may receive a variety of operation request messages, including object creation and deletion requests. To cope with those various requests directed to different destinations, the message management table 111 is partitioned RM by RM, and operation by operation, and each partition has one service status flag and one message queue. Service status flags are cleared ("IDLE") while RMs are inactive. When an RM begins to execute its specific operation, the corresponding service status flag is turned on ("BUSY") Each message queue functions as a buffer memory for queuing operation request messages (e.g., REQ#1 to REQ#4) sent from client applications. This message management table 111 configured as such is used to provide exclusive control as will be described below.

Figure 19:
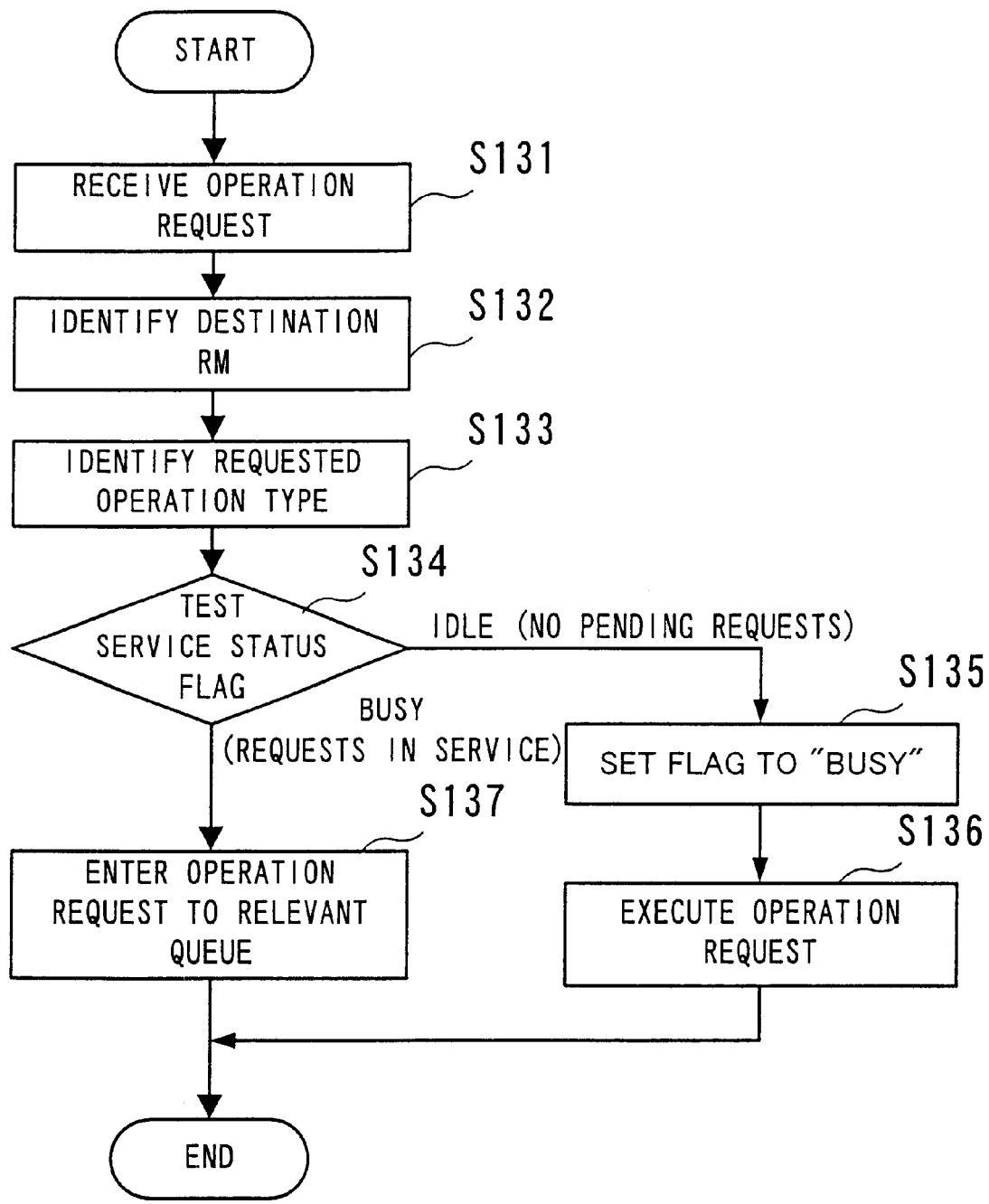
FIG. 19 is a flowchart which shows a process to be executed when an operation request is received.

FIG. 19 is a flowchart which shows a process that the message processor 110 will execute each time an operation request is received. The process details will be described below, according to the sequence of step numbers.

(S131) The message processor 110 receives an operation request message.

(S132) It identifies which RM the received message is destined for.

(S133) It identifies what operation the received message is requesting.

(S134) Now that the destination RM and requested operation are both identified, the message processor 110 tests a relevant service status flag in the message management table 111. If the service status flag indicates a "BUSY" state, the process advances to step S137. If it shows an "IDLE" state, the process branches to step S135.

(S135) Since the service status flag is "IDLE," the message processor 110 now changes it to "BUSY."

(S136) The message processor 110 processes the received operation request and exits from the present session.

(S137) Since the service status flag has been set to "BUSY," the message processor 110 puts the received operation request message into a relevant message queue, and exits from the present session.

Figure 20:
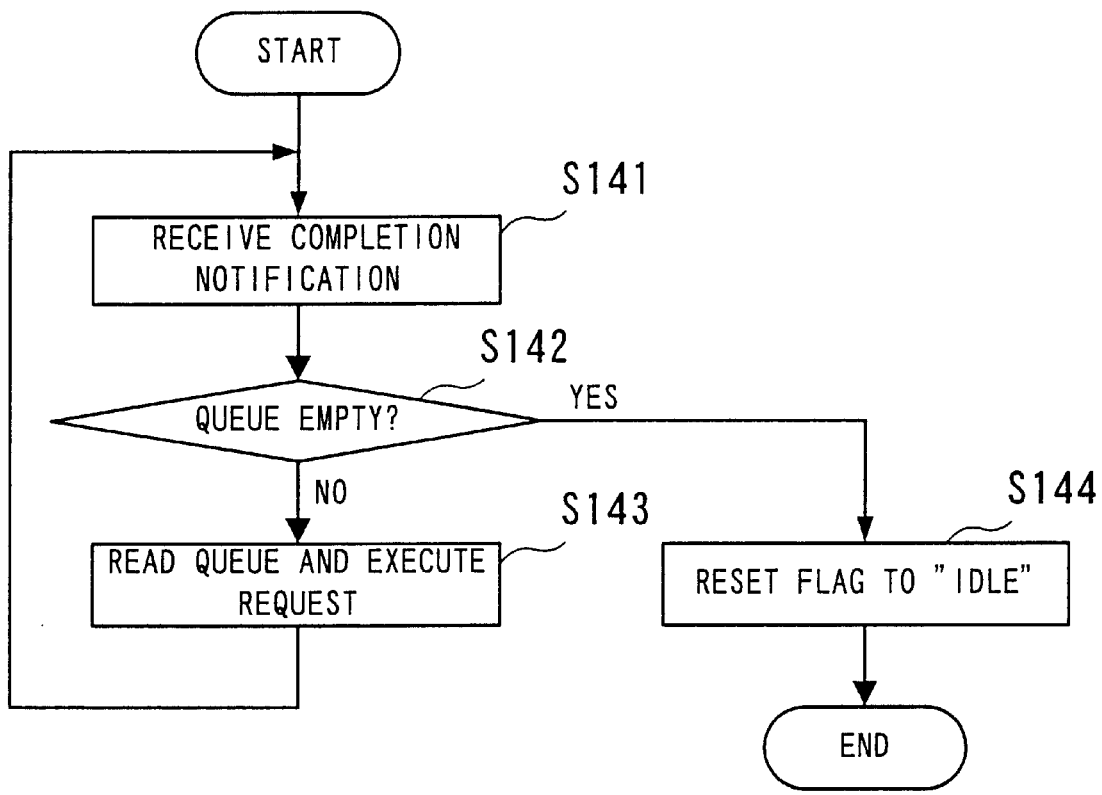
FIG. 20 is a flowchart which shows a process to handle pending operation requests in a message queue.

FIG. 20 is a flowchart showing a process to handle operation request messages stored in a message queue. This process is executed by the message processor 110 when the service status flag corresponding to a particular message queue is set to "BUSY."

(S141) The message processor 110 receives a notification indicating the end of a specific operation request that has been in service.

(S142) The message processor 110 checks the message queue status. If the queue is empty, the process branches to step S144. Otherwise, the process advances to step S143.

(S143) Since there is at least one pending message, the message processor 110 fetches it from the top of the message queue. After processing the message, the message processor 110 returns to step S141.

(S144) Since no entry is found in the message queue, the message processor 110 resets the service status flag to "IDLE," thus terminating the present session.

The above-described exclusive control enables concurrent operation requests to be serviced in an orderly fashion, even if they are concentrated to a single RM.

A more specific application of the proposed object management system will now be described below, with reference to FIGS. 21 to 40.

Figure 21:
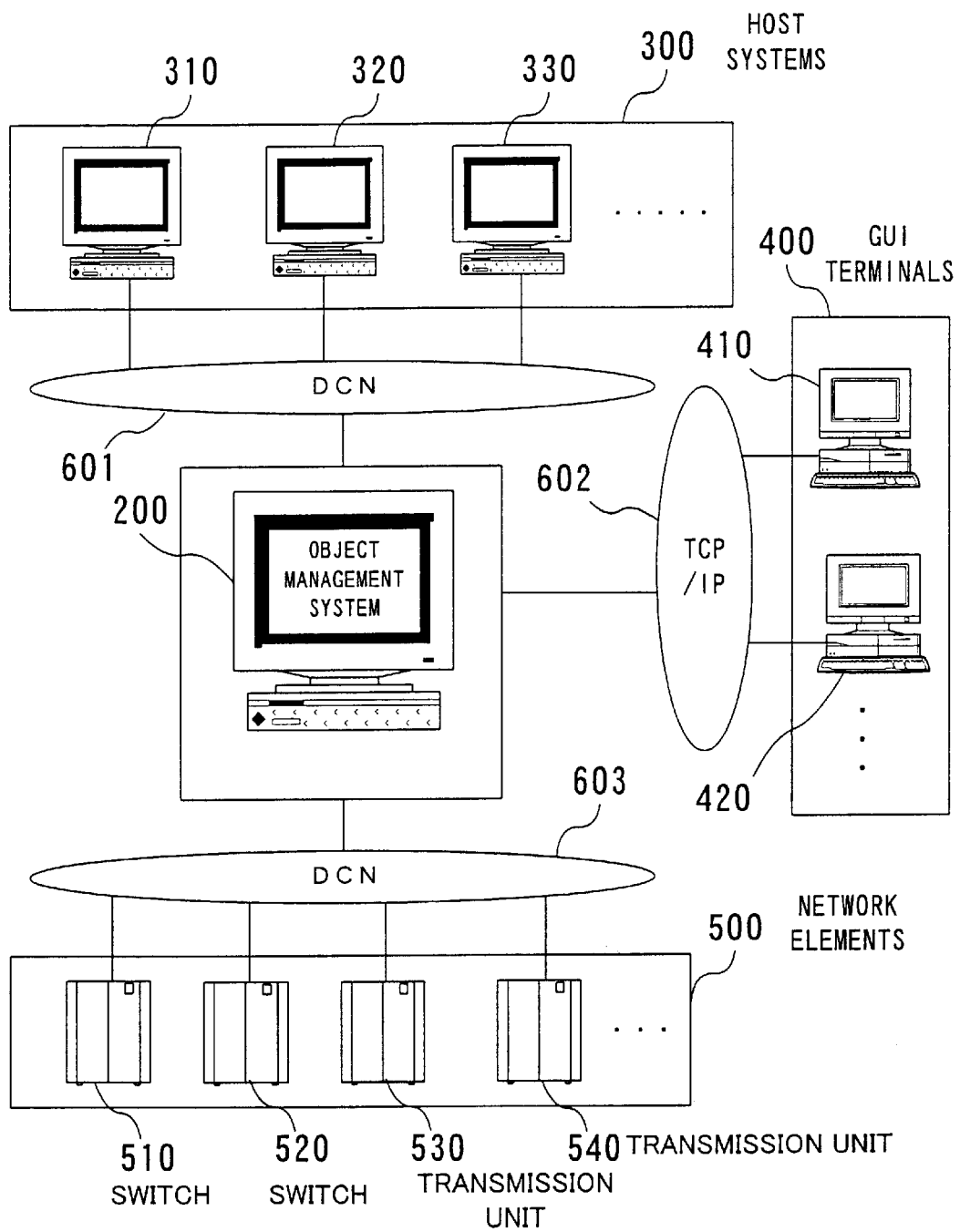
FIG. 21 is a block diagram of a network management system according to the present invention.

FIG. 21 shows a network management system according to the present invention, in which an object management system 200 plays a central role. This object management system 200 is constructed on a computer platform, employing a network element operating system (NE-OS). An object management program running on the NE-OS contains instructions that enable the computer to function as an object management system of the present invention.

As FIG. 21 shows, the object management system 200 is linked to a group of host systems 300 through a data communications network (DCN) 601, as well as to a group of graphic user interface (GUI) terminals 400 via a TCP/IP-based network 602. There is another data communications network 603, which allows the object management system 200 to communicate with a group of network elements (NEs) 500. The host systems 300 includes a plurality of computers 310, 320, and 330, while the GUI terminals 400 includes a plurality of client computers 410 and 420. Client applications are running on those computers 310, 320, 330, 410, and 420 to manage the data communications network 603 and its elements. The network elements 500 include switching systems 510 and 520 and transmission units 530 and 540. Resource managers (RMs) and managed objects (MOs) are created in those switching systems and transmission units; the MOs control their operations.

Figure 22:
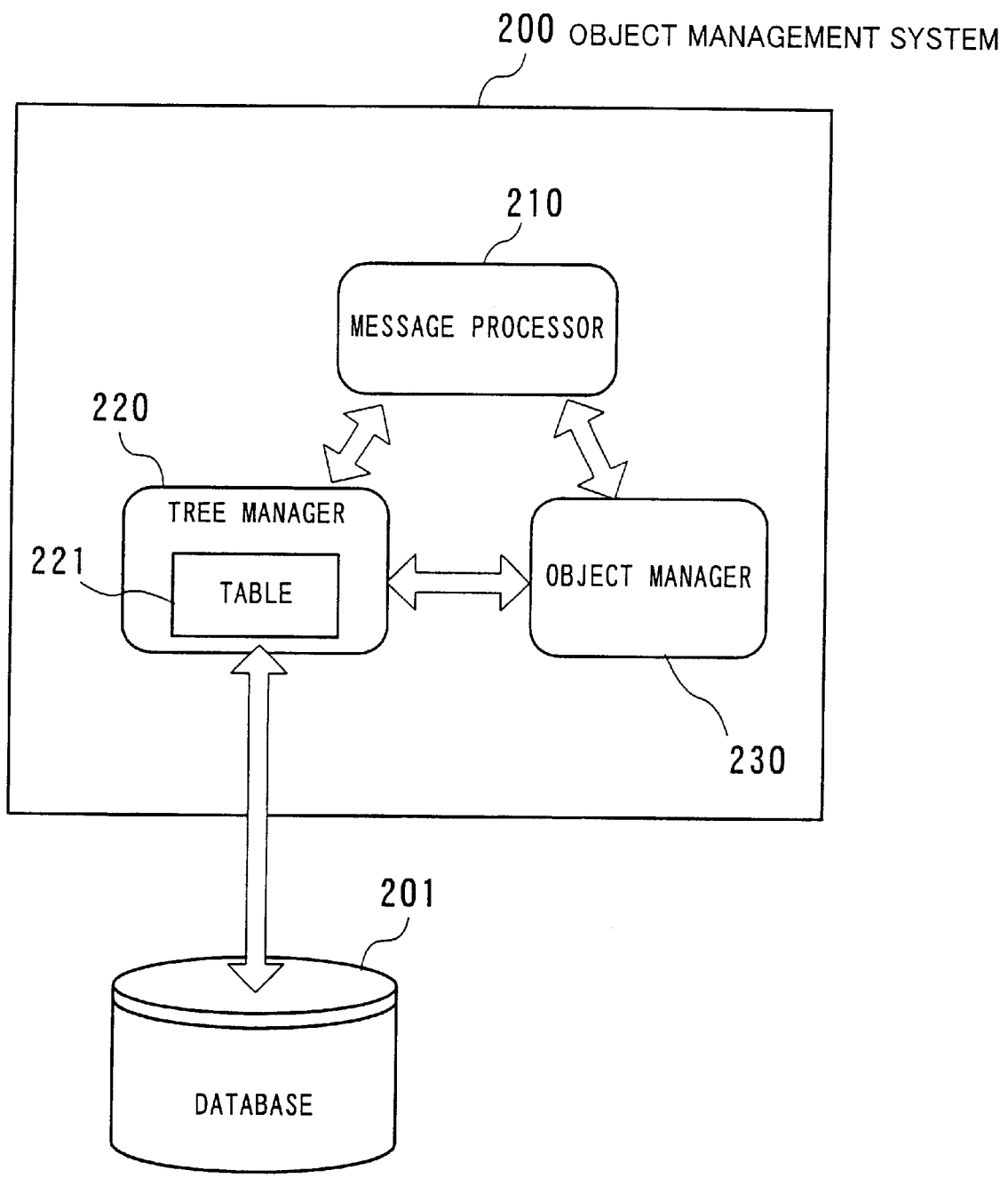
FIG. 22 is a diagram which shows functions provided by an object management program.

FIG. 22 shows primary functions provided by the above-noted object management program running on the object management system 200. They include: a message processor 210, a tree manager 220, and an object manager 230. The message processor 210 accepts operation request messages from the host systems 300 and GUI terminals 400, and forwards them to appropriate destinations according to their content. The tree manager 220 is responsible for the management of tree structure data that describes containment relationships among a plurality of RMs. More specifically, it obtains RMIB data from an external database 201 to build a table 221 for management purposes. Separate RMs are created for different types of MOs, or for different MO classes. The object manager 230 controls total lifecycles of those RMs and MOs, besides managing their containment relationships in the form of a containment tree model.

Figure 23:
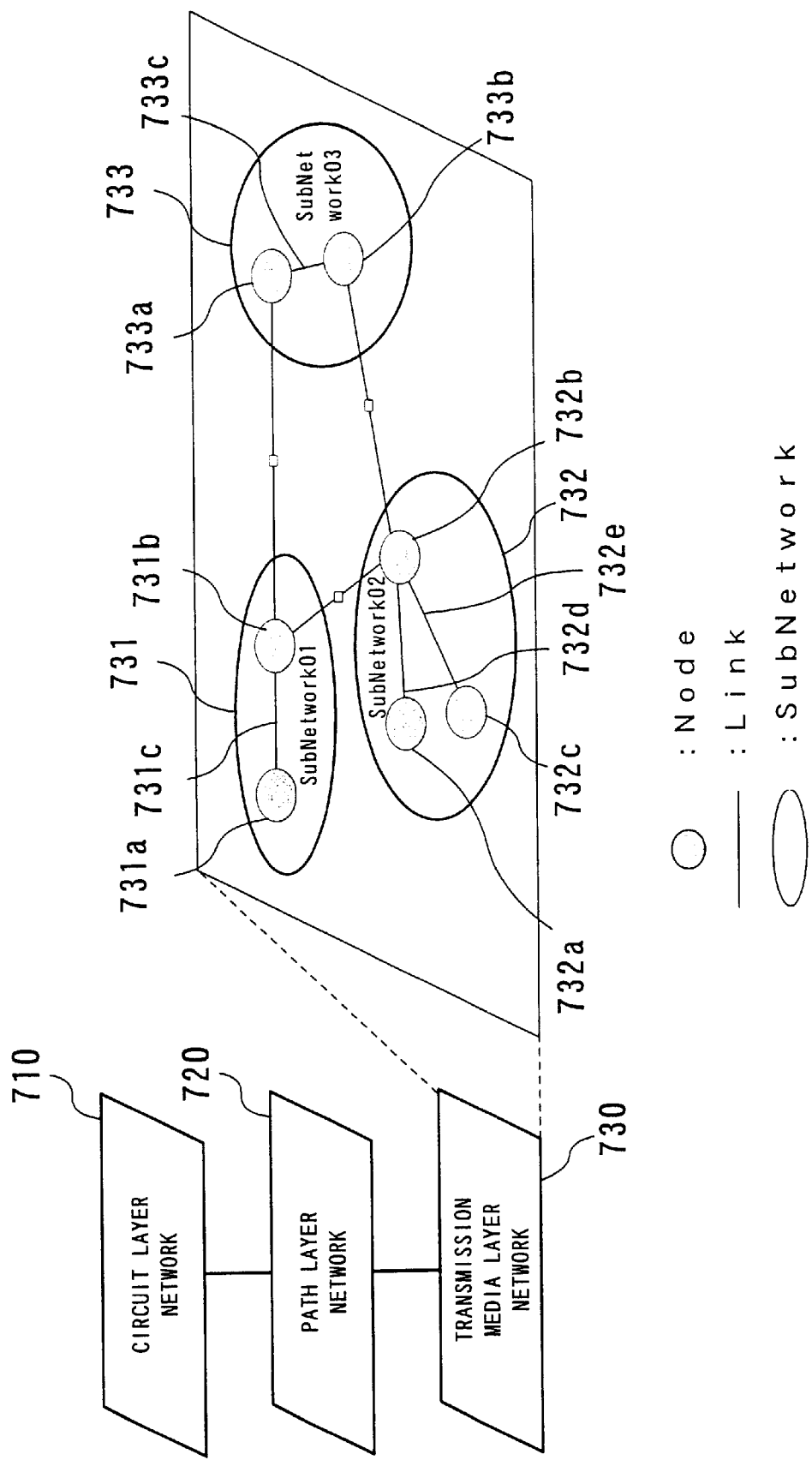
FIG. 23 is a diagram which shows a layered network structure managed by the proposed network management system.

FIG. 23 shows a layered network architecture being managed by the proposed network management system. This network model consists of the following three layer networks: circuit layer network 710, path layer network 720, and transmission medium layer network 730. Here, the circuit layer network 710 is at the highest level, followed by the path layer network 720. The lowest transmission media layer network 730 is partitioned into a plurality of child-level networks, or subnetworks 731 to 733. Those subnetworks 731 to 733 include their nodes 731a, 731b, 732a, 732b, 732c, 733a, and 733b, which are interconnected by internal links 731c, 732d, 732e, and 733c. Note that these three subnetworks 731, 732, and 733 are regarded as MOs having relative distinguished names "SubNetwork01," "SubNetwork02," and "SubNetwork03," respectively. Also, the nodes 731a, 731b, 732a, 732b, 732c, 733a, and 733b are MOs having relative distinguished names "Node11," "Node12," "Node21," "Node22," "Node23," "Node31," and "Node32," respectively. Further, the links 731c, 732d, 732e, and 733c are MOs having relative distinguished names "Link11," "Link21," "Link22," and "Link31," respectively.

Figure 24:
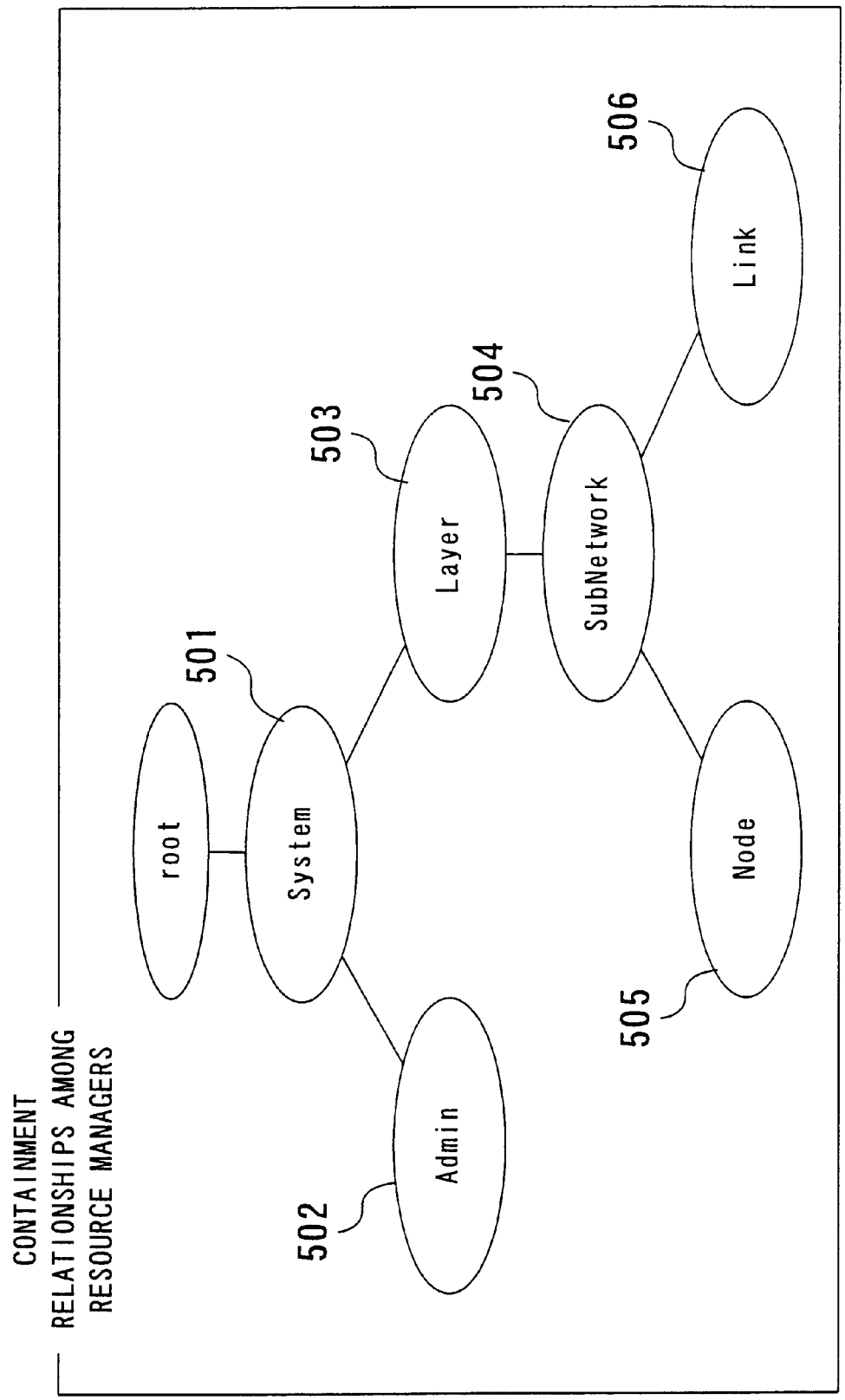
FIG. 24 is a diagram which shows a containment tree structure of layer networks.

Containment relationships of such layer network resources are depicted in the form of a containment tree structure of FIG. 24, in which a plurality of RMs 501 to 506 are interrelated in a hierarchical manner. The RMs 501 to 506 have their own relative distinguished names "System," "Admin," "Layer," "SubNetwork," "Node," and "Link." The definition of such a containment tree structure is available in a resource management information base (RMIB) shown in FIG. 25. This RMIB data, stored in the database 201, serves as source data for creating a containment tree as will be described below.

Figure 26:
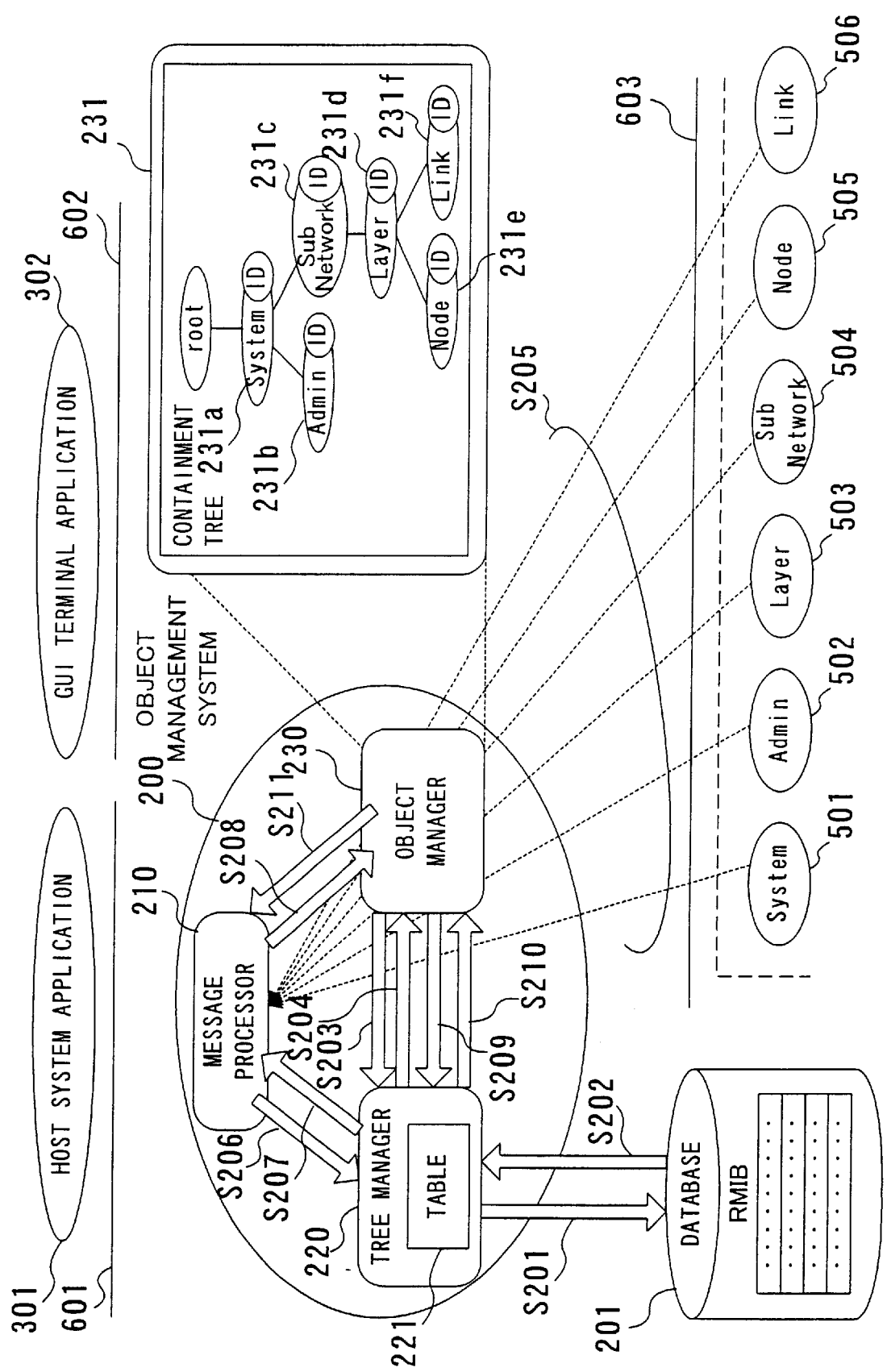
FIG. 26 is a diagram which shows a process to create, or initialize, a containment tree when the system starts up.

FIG. 26 shows a process of creating, or initializing, a containment tree when the object management system 200 starts up. This process begins with a request for RMIB data from the tree manager 220 to the database 201 (Step S201). Receiving the requested RMIB data from the database 201 (Step S202), the tree manager 220 stores it into this local table 221. After that, the object manager 230 requests the tree manager 220 to supply the tree structure data stored in the table 221 (Step S203), and receives the data from the tree manager 220 (Step S204). Based on the received tree structure data, the object manager 230 builds an initial structure of a containment tree 231, which includes node objects 231a to 231f corresponding to the RMs 501 to 506, respectively.

The message processor 210 is now ready to accept object ID registration messages from the RMs 501 to 506. When such a message is received (Step S205), the message processor 210 requests the tree manager 220 to register the received object ID information (Step S206), and receives a response to it (Step S207). The message processor 210 then directs the object manager 230 to receive the object ID information from the tree manager 220 (Step S208). The object manager 230 requests the tree manager 220 to read out the object ID information from the table 221 (Step S209), and receives a response to it (Step S210). The object manager 230 then informs the message processor 210 of the completion (Step S211). FIG. 27 shows the resultant table data held in the table 221 of the tree manager 220. This table 221 contains the object ID information collected from RMs, in addition to the RMIB data retrieved from the database 201.

Figure 28:
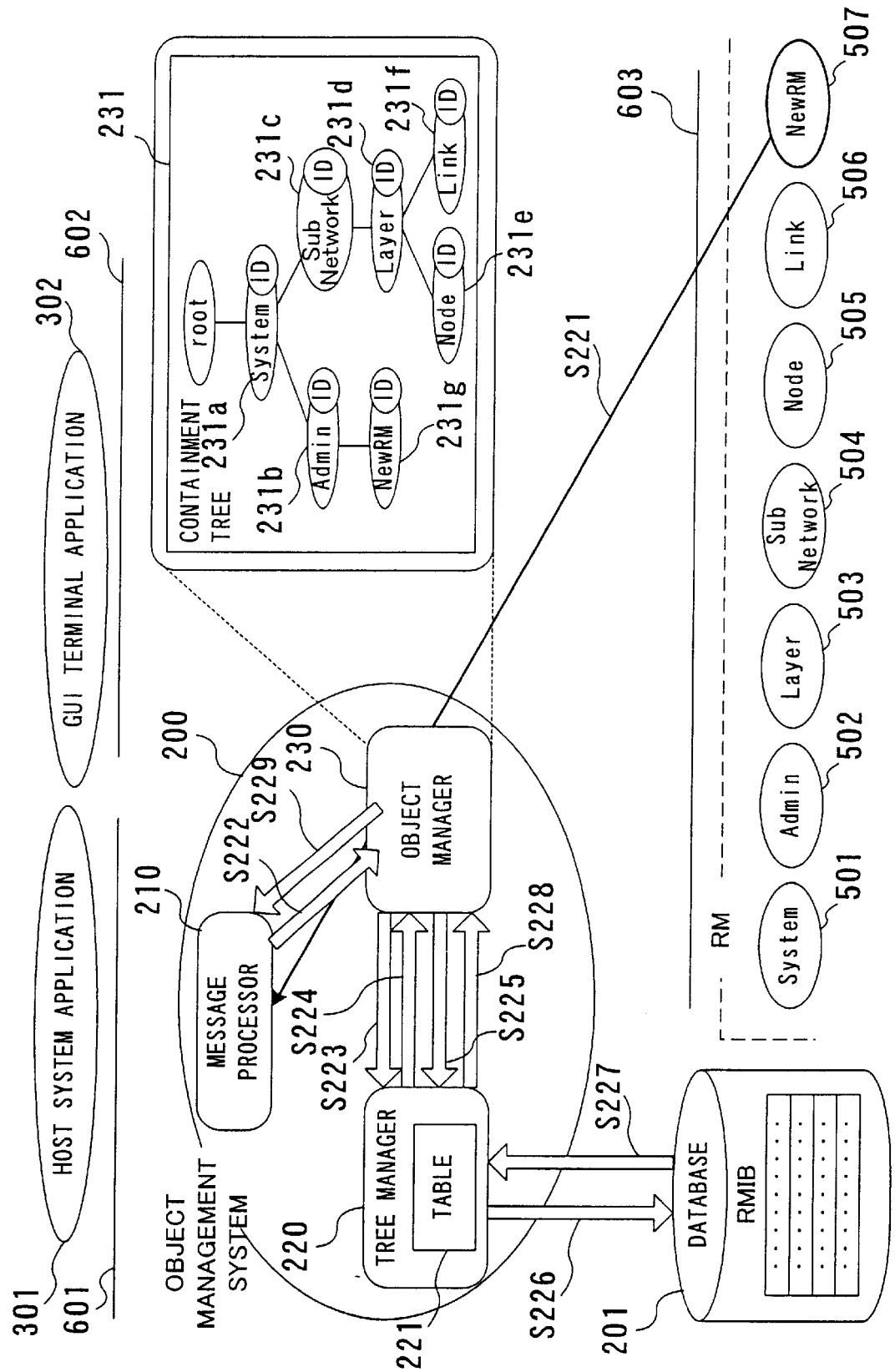
FIG. 28 is a diagram which shows how the system updates tree structure data during its operation to include a newly created RM entry.

Referring next to FIG. 28, the following section will describe how the system updates tree structure data during its operation to include a newly created RM entry.

FIG. 28 shows such a situation where an RM 507 is newly created as a child object of the RM 502 and assigned a relative distinguished name "NewRM." This RM 507, when created, sends an RM creation indication message to the message processor 210 (Step S221). Upon receipt of this notification message, the message processor 210 requests the object manager 230 to update its tree structure data (Step S222). The object manager 230 first sends a query to the tree manager 220 to check the presence of a parent of the RM 507 (Step S223). The tree manager 220 checks it and returns a response to the object manager 230 (Step S224). If a relevant parent RM (i.e., RM 502 in this example) is found, the object manager 230 requests the tree manager 220 to update the tree structure data (Step S225). According to this request, the tree manager 220 demands the database 201 to update the RMIB data (Step S226) and receives a response to it (Step S227). The tree manager 220 also updates its own table 221 and notifies the object manager 230 of the completion of data update. (Step S228). The object manager 230 now adds a new node object 231g to the containment tree 231, and informs the message processor 210 that the requested data update operation is finished (Step S229).

Figure 30:
FIG. 30 is a diagram which shows updated table data including a newly added RM entry.

FIG. 29 shows the updated RMIB in the database 201. As a result of update, the RMIB now includes a record of the newly created RM 507. FIG. 30, on the other hand, shows the updated table entries. Similar to the RMIB data, the table 221 in the tree manager 220 has been added a new entry describing the RM 507.

Figure 31:
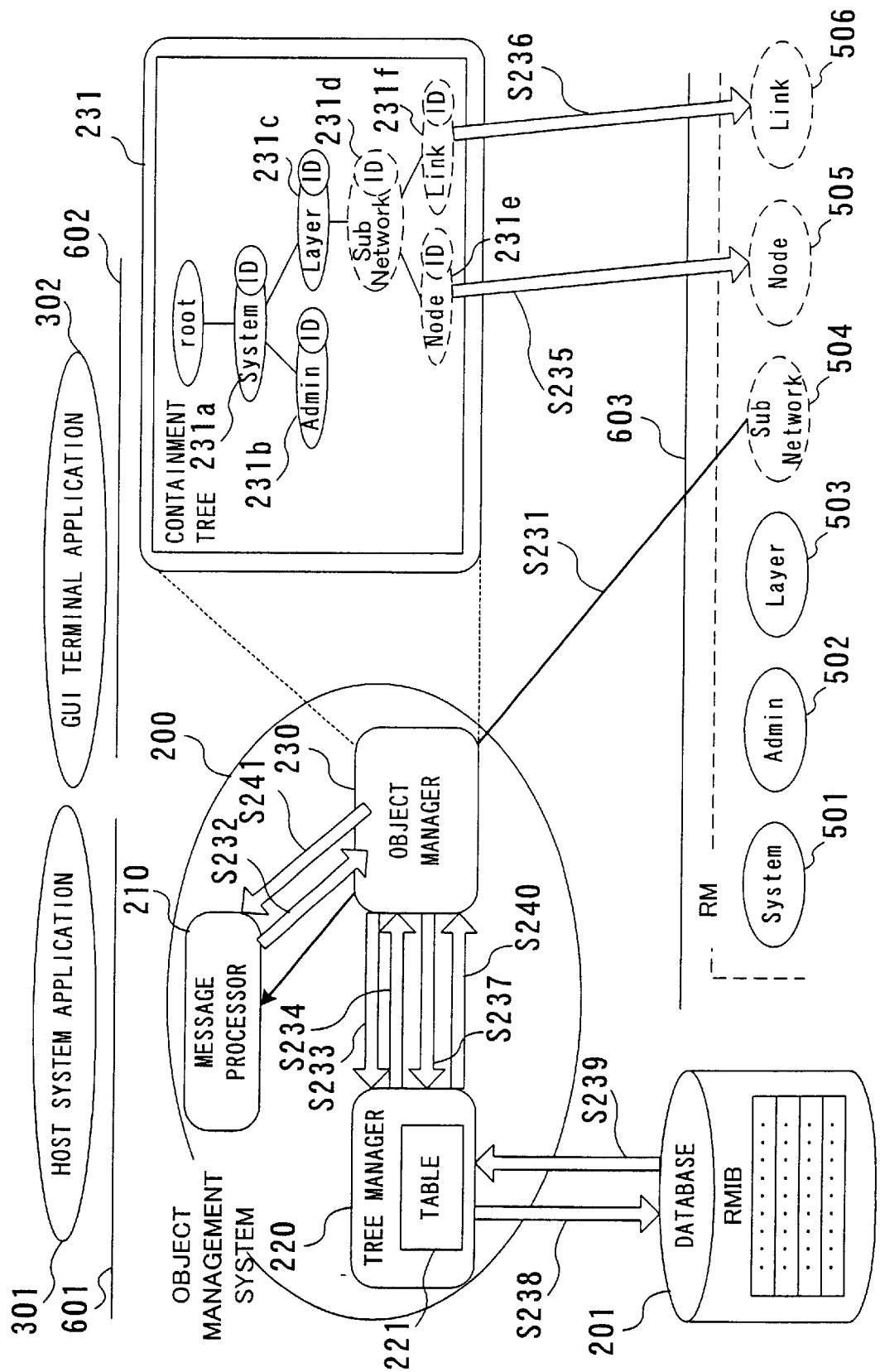
FIG. 31 is a diagram which shows how the system updates tree structure data during its operation to delete some specific RM entries.
Figure 32:
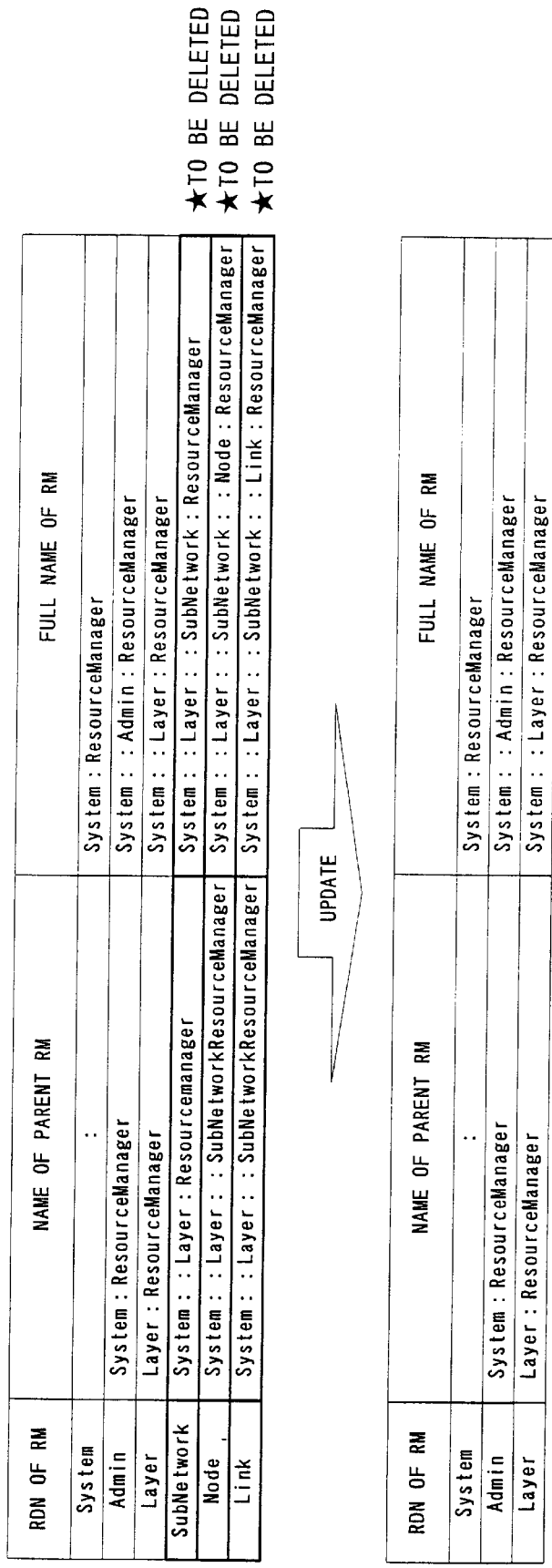
FIG. 32 is a diagram which shows RMIB data updated as a result of deletion of resource managers.
Figure 33:
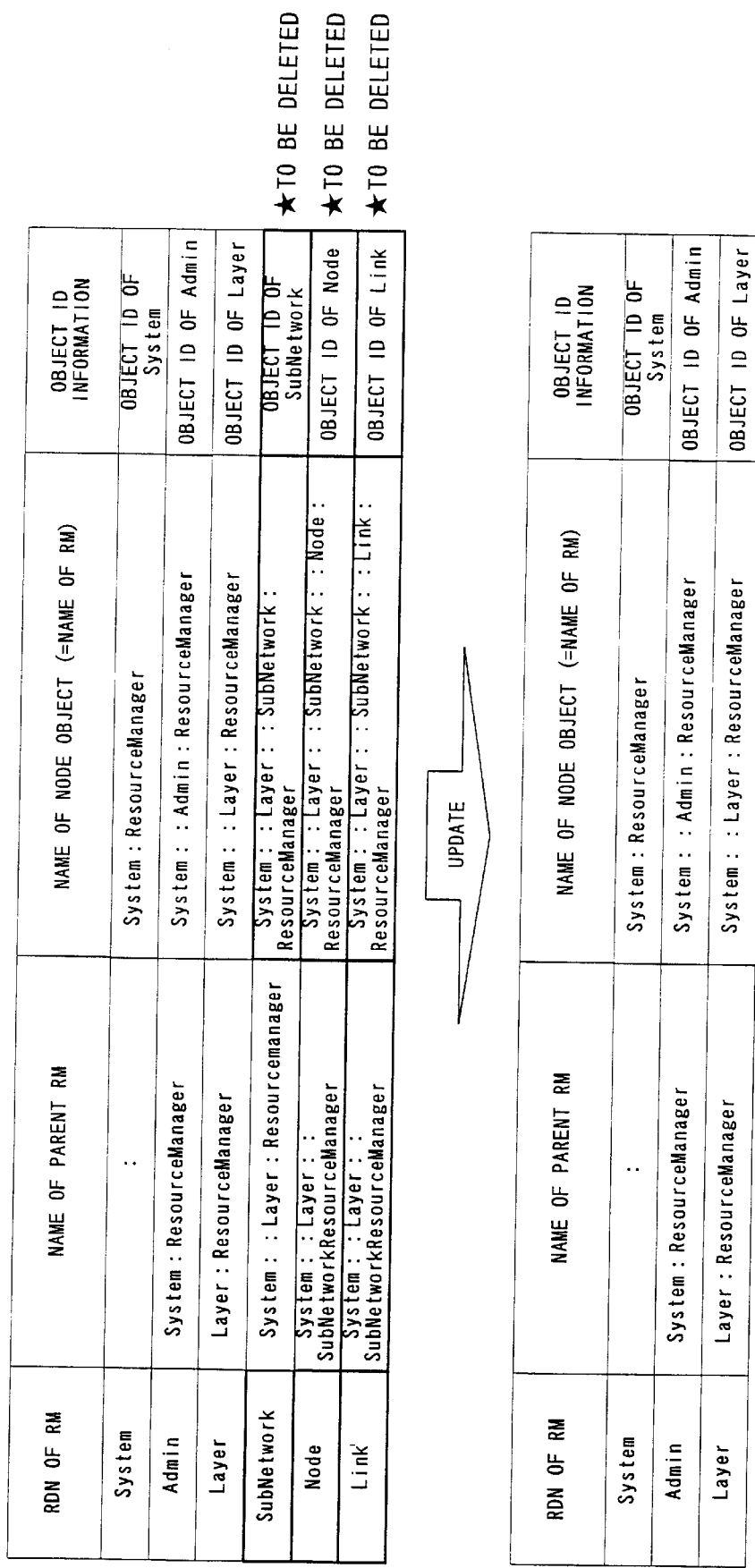
FIG. 33 is a diagram which shows table entries updated as a result of deletion of resource managers.

Referring now to FIGS. 31 to 33, the next section will describe a process executed when some RMs are deleted.

FIG. 31 shows how the system updates tree structure data during its operation, to delete some specific RM entries. More specifically, it is assumed that an RM 504 named "SubNetwork" is to be deleted. The process begins with an RM deletion indication message issued from the RM 504 to the message processor 210 (Step S231). The message processor 210 responds to this message by requesting the object manager 230 to update its tree structure data (Step S232). The object manager 230 first sends a query to the tree manager 220 to check the presence of lower-level RMs (or child RMs) under the RM 504 in question (Step S233). The tree manager 220 checks the table 221 accordingly, and returns its response to the object manager 230 (Step S234). In the present example, the RM 504 has two child RMs 505 and 506. Therefore, the object manager 230 directs the child RMs 505 and 506 to terminate themselves (Steps S235 and S236). The object manager 230 then requests the tree manager 220 to update the tree structure data (Step S237). The tree manager 220 demands the database 201 to update the RMIB data (Step S238) and receives a response to it (Step S239). The tree manager 220 also updates its own table 221 and notifies the object manager 230 of the completion of data update. (Step S240). The object manager 230 now removes node objects 231d, 231e, and 231f from the containment tree 231, together with their object ID information. It then informs the message processor 210 that the requested data update operation is finished (Step S241). Note that the object manager 230 is designed to start from the bottom layer of the containment tree 231, when deleting objects. In the case of FIG. 31, the first is the bottom-level node objects 231e and 231f, followed by the object 231d at the next level.

FIG. 32 shows the updated RMIB in the database 201. Note that there are no records for the obsolete RMs 504 to 506 in the updated RMIB. FIG. 33, on the other hand, shows the updated table data. Similar to the RMIB data of FIG. 32, obsolete entries of the deleted RMs 504 to 506 have been removed from the table 221 in the tree manager 220.

Figure 34:
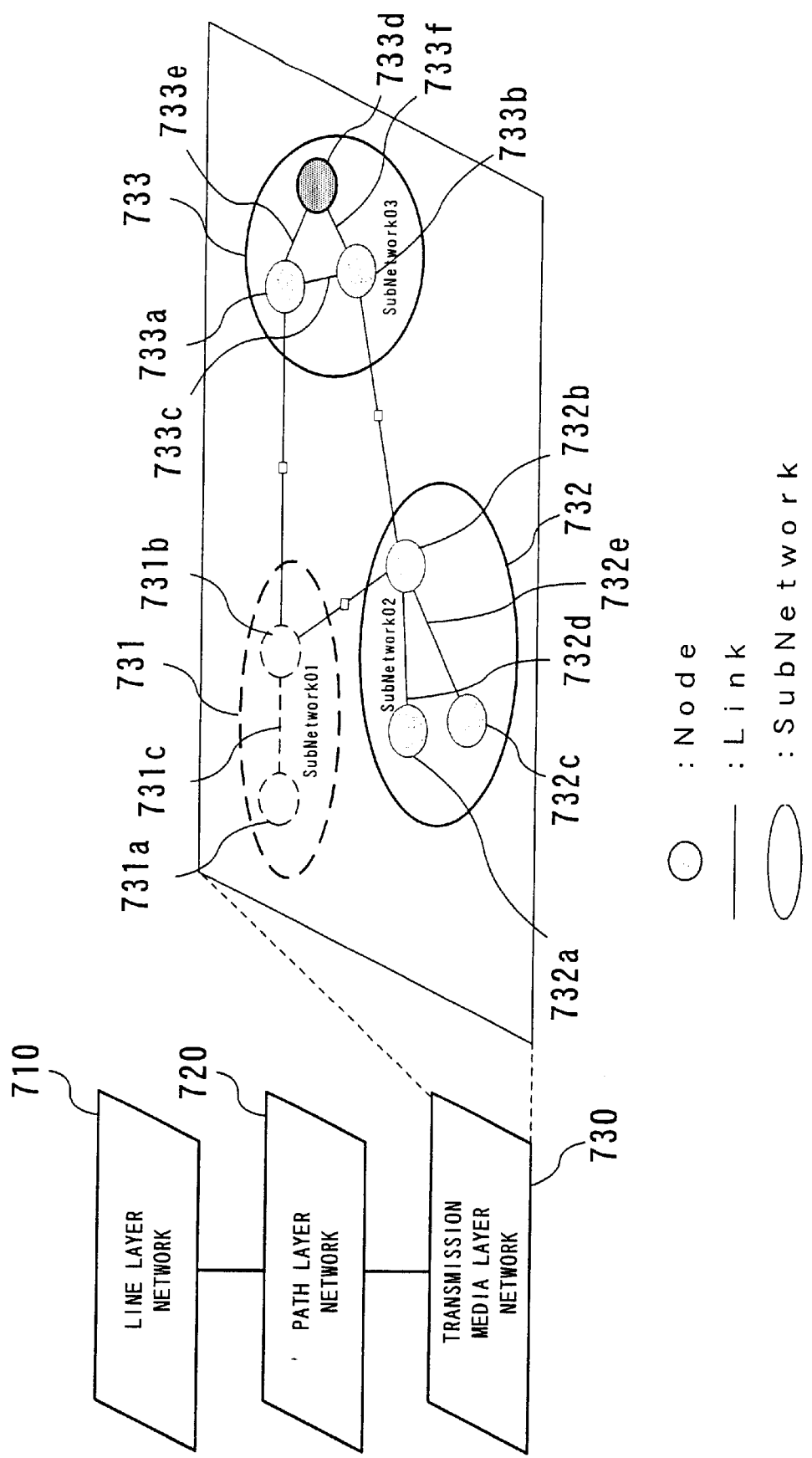
FIG. 34 is a diagram which shows an example of changes in the layered network structure.

The network management system has to deal with possible changes in the structure of layer networks. FIG. 34 shows an example of such changes. Compared with the layer networks of FIG. 23, a new node 733d is added to the existing subnetwork 733, together with two new links 733e and 733f, while the subnetwork 731 is entirely removed.

Figure 35:
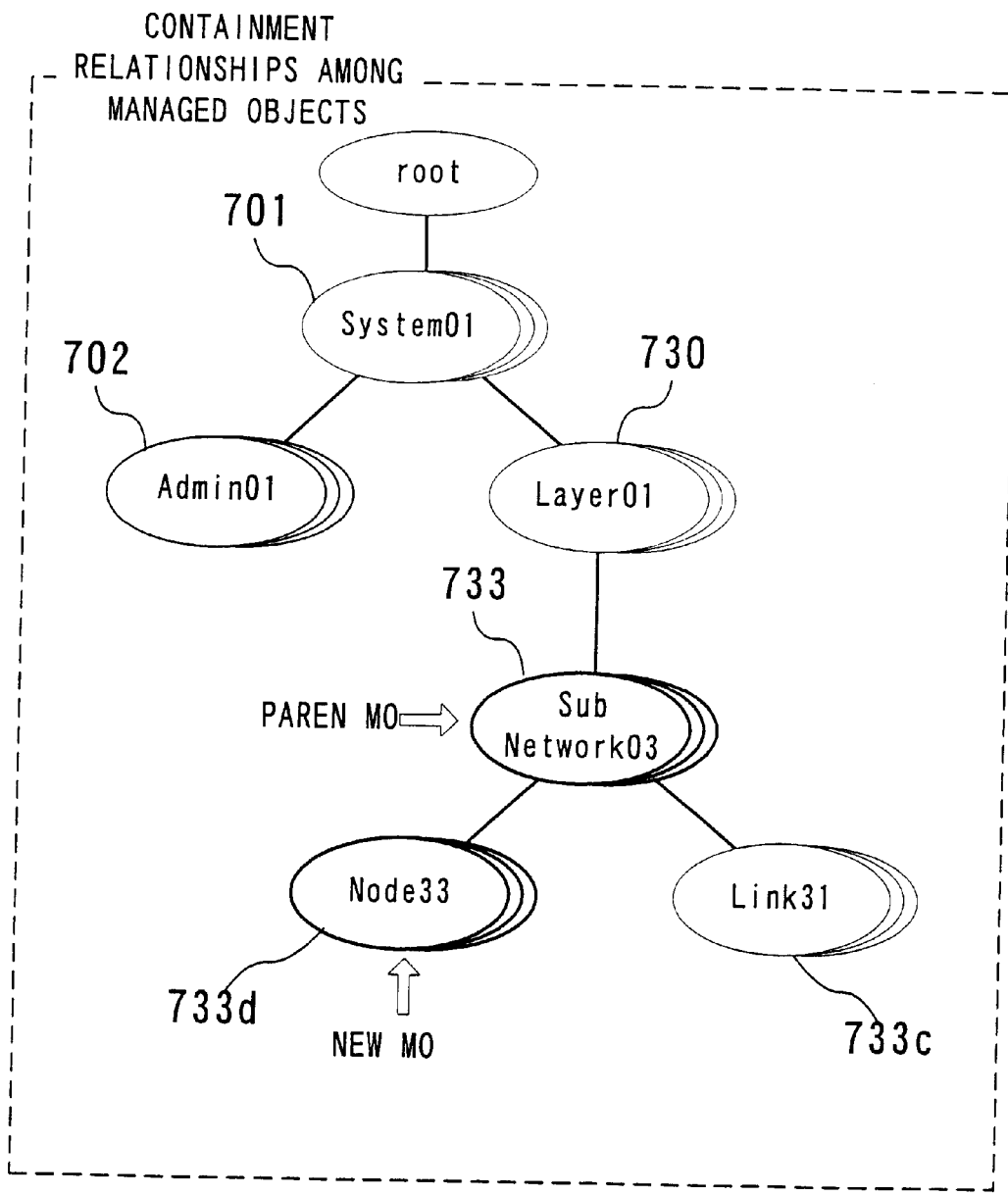
FIG. 35 is a diagram which shows containment relationships among MOs.

FIG. 35 shows the containment relationships among MOs. In this graph, the new network node 733d is identified by a distinguished name "System:System01:Layer:Layer01:SubNetwork:Subnetwork03:Node:Node33," while its parent (i.e., the subnetwork 733) is identified by "System:System01:Layer:Layer01:SubNetwork:Subnetwork03."

Figure 36:
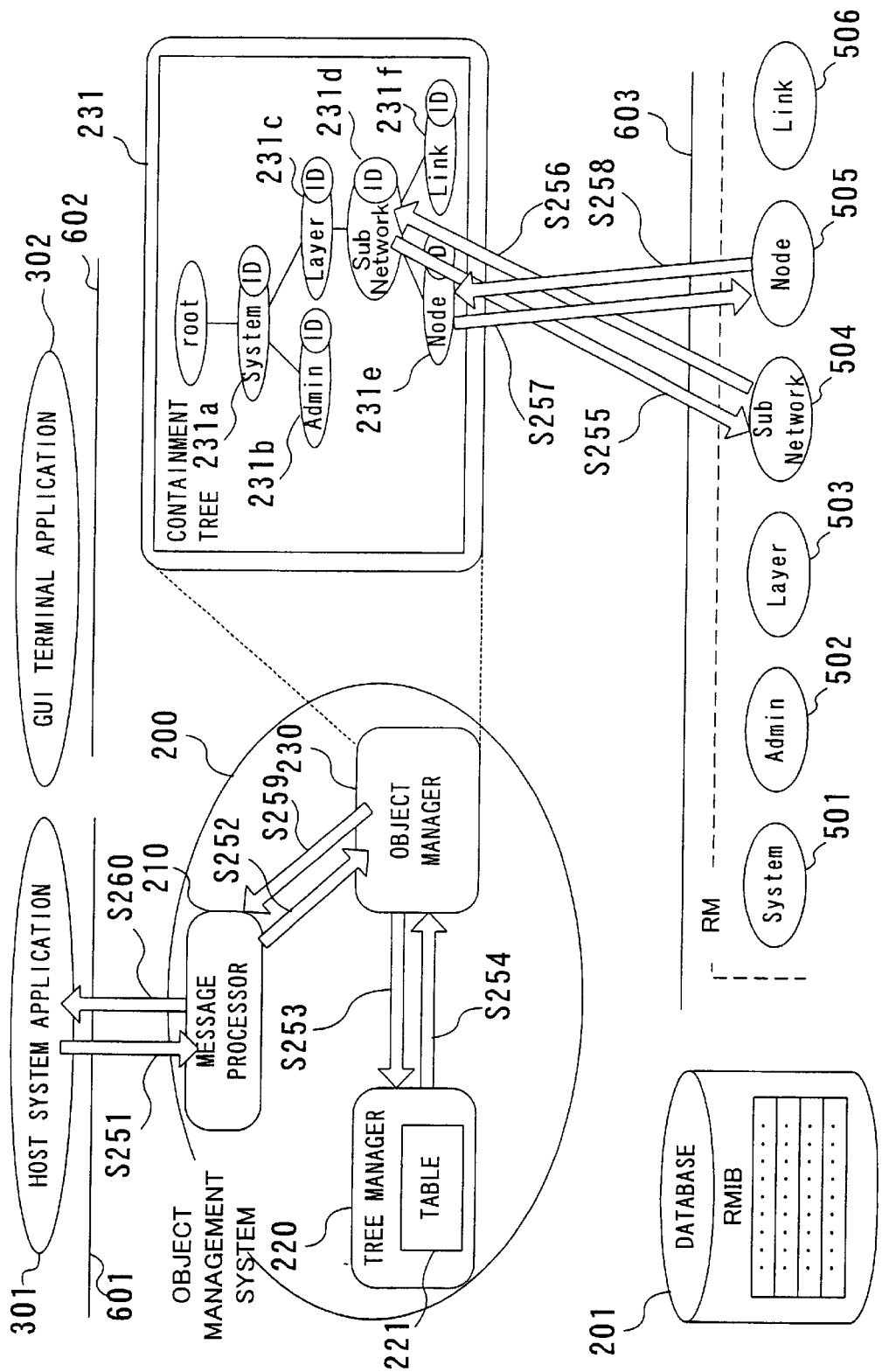
FIG. 36 is a diagram which shows a process to create a new managed object at the request of a host system application.

FIG. 36 shows a process to create a new MO at the request of a host system application. Consider that a host system application 301 sends a request message to the message processor 210 for creation of a new node 733d (Step S251). This request message should contain the distinguished name of a new MO to be created, which is "System:System01:Layer:Layer01:SubNetwork:SubNetwork03:Node:Node33" in the present example. Upon receipt of such information, the message processor 210 asks the object manager 230 to create the requested MO (Step S252). As mentioned earlier, the new network node 733d is an entity in the subnetwork 733 with a relative distinguished name "SubNetwork03," meaning that the network node 733d is under the control of such an RM that governs the subnetwork 733. Therefore, the object manager 230 asks the tree manager 220 to check the presence of a relevant parent RM, or the subnetwork 733, before creating the requested MO (Step S253). The tree manager 220 checks it and returns a response to the object manager 230, accordingly (Step S254).

In the present case, the RM 504 is found to be the parent RM in question. Then the object manager 230 attempts to check the presence of a corresponding parent MO by sending a query message to the RM 504, together with a distinguished name "System:System01:Layer:Layer01:SubNetwork:SubNetwork03" (Step S255). At this step, the object ID information of a node object 231d is used to reach the RM 504. In the present example, the RM 504 returns a response to the object manager 230, stating that the subnetwork 733 is found be the parent MO in question (Step S256).

Since the parent MO is found, the object manager 230 now requests the RM 505 to create a new network node 733d. More specifically, the object manager 230 first obtains the object ID information of a node object 231e to reach the RM 505 ("Node"). Then it requests the RM 505 to create an object of the network node 733d, specifying its distinguished name "System:System01:Layer:Layer01:SubNetwork: SubNetwork03:Node:Node33" (Step S257). In response to this, the RM 505 creates the requested network node 733d as a new MO and notifies the object manager 230 that the requested MO is created (Step S258). Upon receipt of this notification, the object manager 230 returns a response to the message processor 210 to indicate the completion (Step S259). This allows the message processor 210 to send a response message back to the host system application 301 (Step S260).

Figure 37:
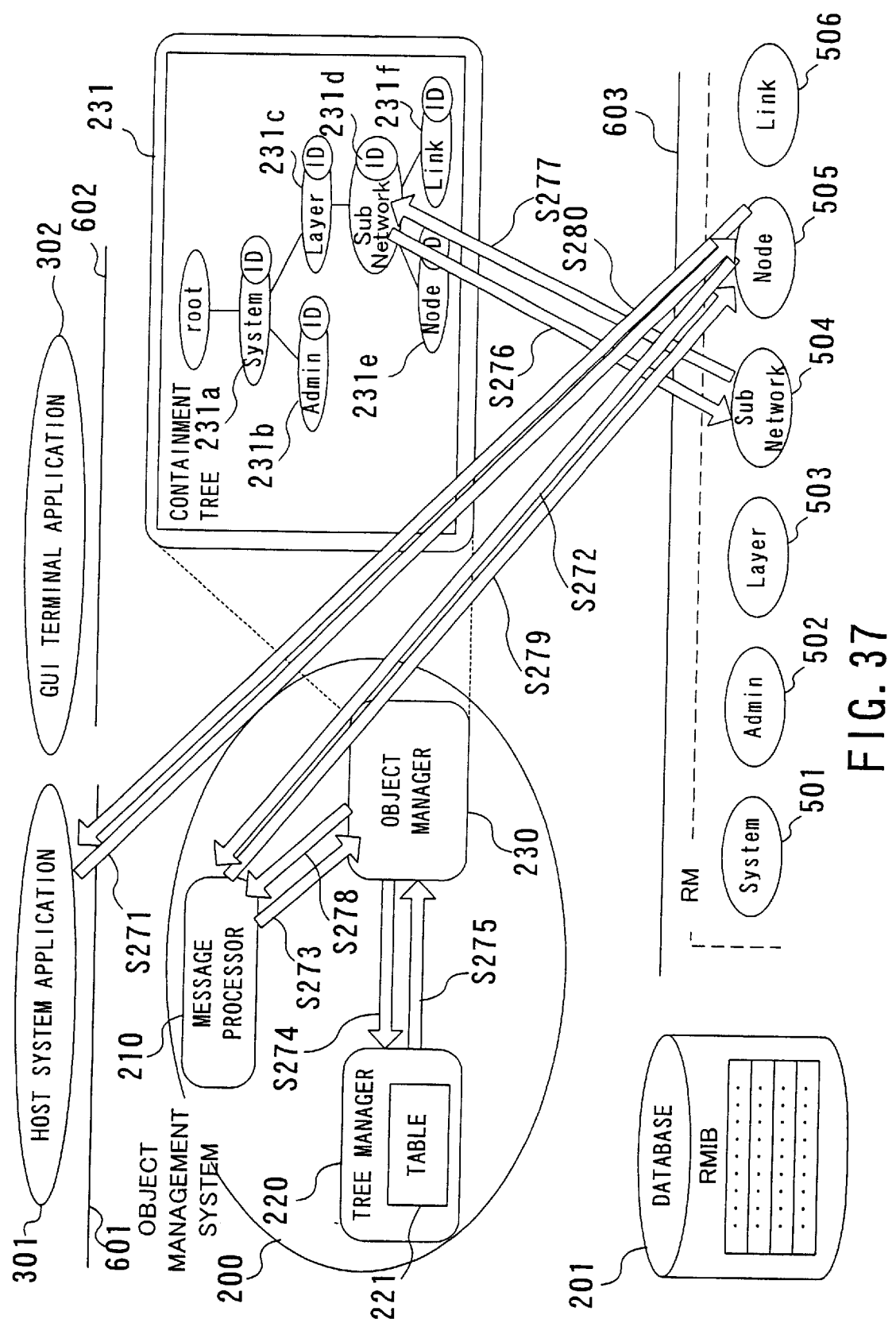
FIG. 37 is a diagram showing a process to be executed when a host system application has directly requested a resource manager to create a new managed object.

While the object management system 200 plays a coordinator role to create a new MO as in the above example, host system applications are also allowed to send like requests directly to relevant RMs. FIG. 37 shows the behavior of the object management system 200 in the latter case. Suppose here that the host system application 301 has made direct access to an RM 505 to create a new MO (Step S271). In response to the request, the RM 505 sends a query message to the object management system 200 to check the presence of a parent of the requested MO (Step S272) The message processor 210 receives this query message enclosing a distinguished name of an MO 733d to be created, which reads as follows: "System:System01:Layer:Layer01:SubNetwork:SubNetwork03:Node:Node33." The message processor 210 then activates the object manager 230 to check the presence of the parent MO in question (Step S273). To answer this question, the object manager 230 first requests the tree manager 220 to check whether a relevant parent RM exists or not (Step S274) and receives a response to it (Step S275).

In the present case, the RM 504 ("Subnetwork") is found to be the parent RM in question. Thus the object manager 230 attempts to check the presence of a corresponding parent MO by supplying the RM 504 with a distinguished name "System:System01:Layer:Layer01:SubNetwork: SubNetwork03" (Step S276). Again, the object ID information of a node object 231d is used here to locate the RM 504. In the present example, the RM 504 performs a check and responds to the object manager 230, stating that the subnetwork 733 is found to be the parent MO in question (Step S277). The object manager 230 returns the result to the message processor 210 (Step S278), and the message processor 210 delivers it to the RM 505 (Step S279). Confirming the presence of the parent MO 733, the RM 505 creates a network node 733d, thus returning a completion notification to the host system application 301 (Step S280).

Figure 38:
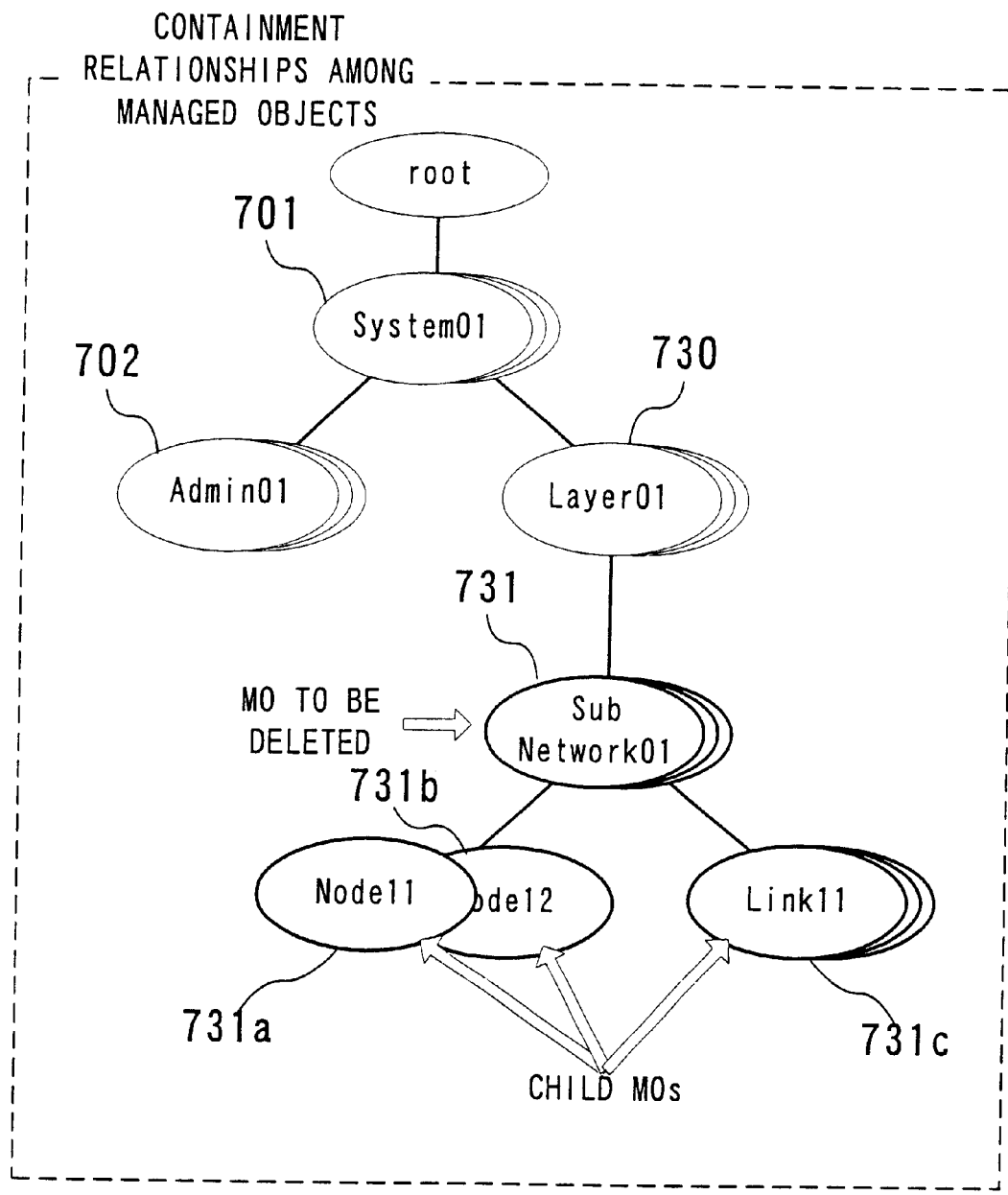
FIG. 38 is a diagram which shows containment relationships of managed objects, involving a specific object that should be deleted.

Referring again to FIG. 34, the changes in the layer network structure include removal of the subnetwork 731 having a relative distinguished name "SubNetwork01." The scope of this change is now depicted in FIG. 38, which shows the containment relationships among MOs. Referring to this FIG. 38, the subnetwork 731 is identified by its distinguished name "System:System01:Layer:Layer01:SubNetwork:Subnetwork01," and contains the following three child MOs:

node 731a with a distinguished name "System:System01:Layer:Layer01:SubNetwork:Subnetwork01:Node:Node11"

node 731b with a distinguished name "System:System01:Layer:Layer01:SubNetwork:Subnetwork01:Node:Node12"

link 731c with a distinguished name "System:System01:Layer:Layer01:SubNetwork:Subnetwork01:Link:Link11"

Figure 39:
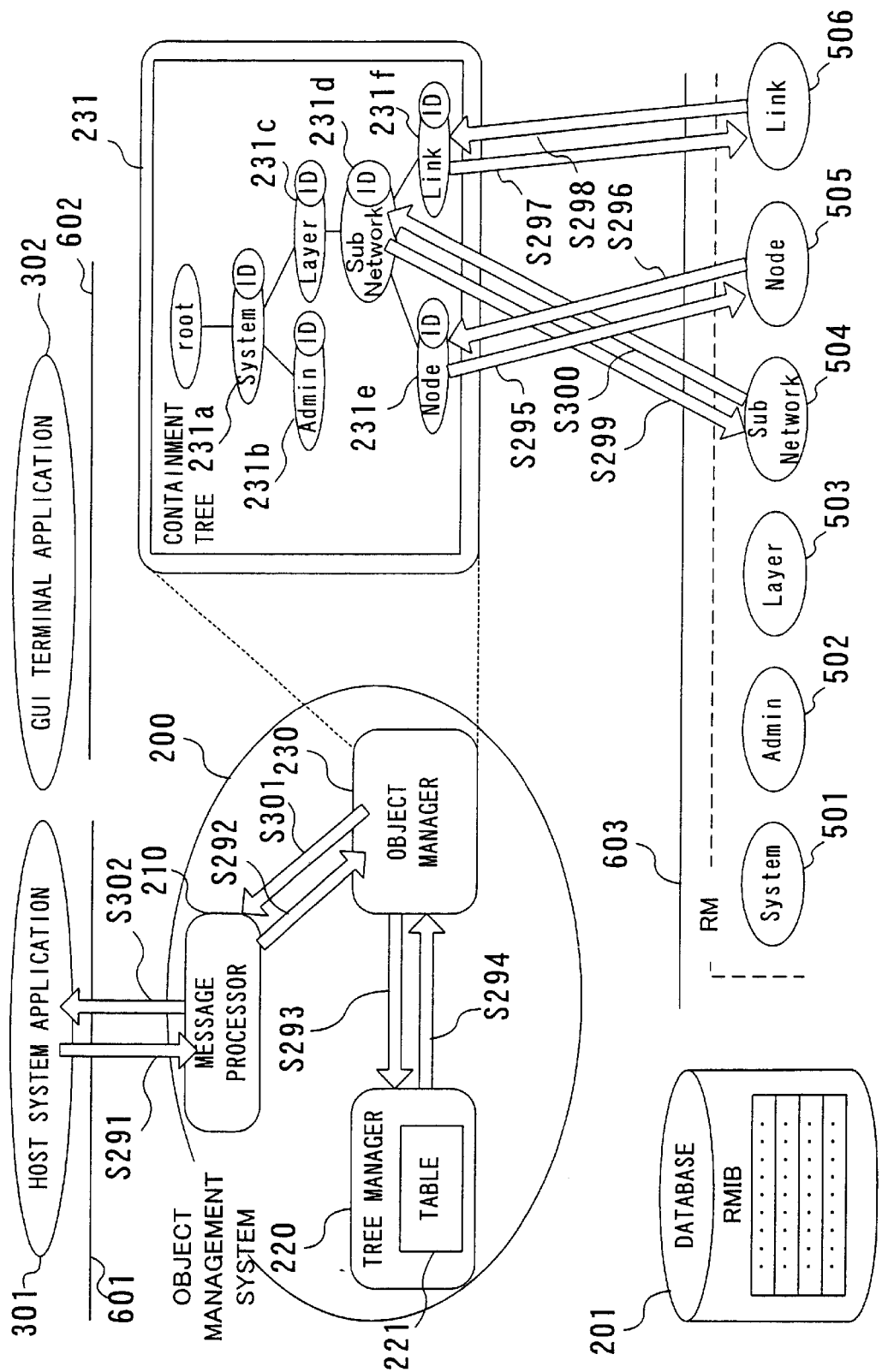
FIG. 39 is a diagram which shows a process to delete a managed object.

Referring next to FIG. 39, a process to delete such MOs will be described below. This object deletion process starts with a request message sent from the host system application 301 to the to the message processor 210 (Step S291). At this stage, the request message only specifies a single MO with a distinguished name "System:System01:Layer:Layer01:SubNetwork:SubNetwork01" (i.e., the subnetwork 731). The message processor 210 forwards this request to the object manager 230 (Step S292). Since it is a general requirement that the removal of Mos should be conducted from lower levels to higher levels, the object manager 230 first asks the tree manager 220 to check the presence of child RMs before removing the MO (Step S293) and receives a response to it (Step S294).

In the present case, the containment tree 231 indicates that the RM 504 ("Subnetwork") contains two child RMs 505 ("Node") and 506 ("Link"). This implies that there may be some lower-level MOs (i.e., nodes and/or links) contained in the subnetwork 731. Accordingly, the object manager 230 requests those child RMs 505 and 506 to delete all lower-level MOs under the MO named "System:System01:Layer:Layer01:SubNetwork:SubNetwork01" (Steps S295 and S297). Here, the object manager 230 uses object ID information of node objects 231e and 231f to reach the RMs 505 and 506, respectively.

As a result of the above steps, the RMs 505 and 506 delete the following objects:

node 731a with a distinguished name "System:System01:Layer:Layer01:SubNetwork:Subnetwork01:Node:Node11"

node 731b with a distinguished name "System:System01:Layer:Layer01:SubNetwork:Subnetwork01:Node:Node12"

link 731c with a distinguished name "System:System01:Layer:Layer01:SubNetwork:Subnetwork01:Link:Link11"

The RMs 505 and 506 then send their responses to the object manager 230 to indicate that the child MOs have been successfully removed (Steps S296 and S298).

The object manager 230 now deletes the intended MO representing the subnetwork 731. More specifically, the object manager 230 reaches the RM 504 by using the object ID information of the corresponding node object 231d, thus asking to delete an MO having a distinguished name "System:System01:Layer:Layer01:SubNetwork: SubNetwork03" (Step S299). In response to this request, the RM 504 deletes the subnetwork 731 and sends its response back to the object manager 230 (Step S300). The object manager 230 then returns the result to the message processor 210 (Step S301), and the message processor 210 delivers the result to the host system application 301 (Step S302).

The following section will now provide specifics of queuing control for incoming operation requests.

Figure 40:
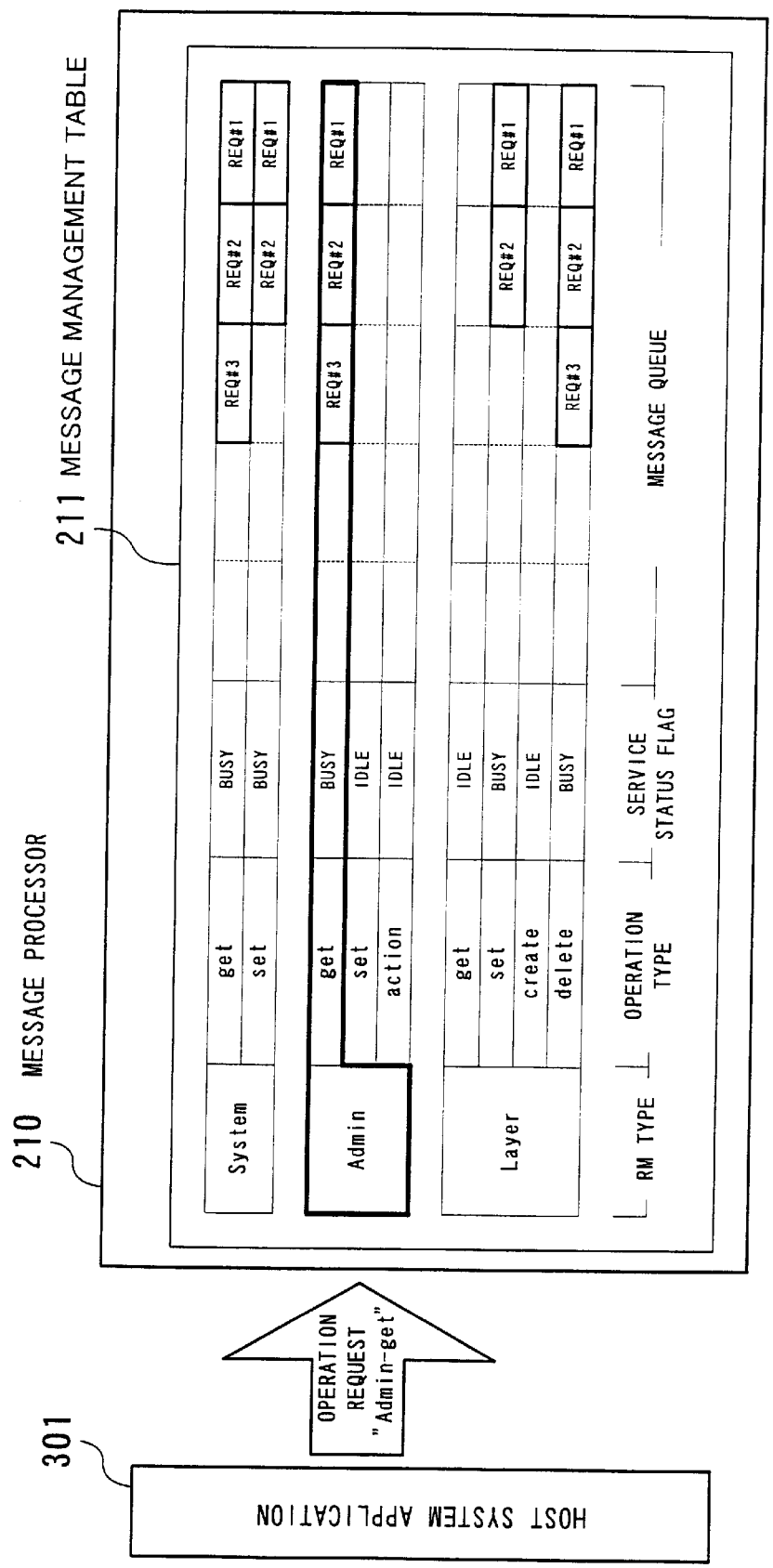
FIG. 40 is a diagram which shows an example of exclusive control to handle operation request messages sent from host system applications.
Figure 41:
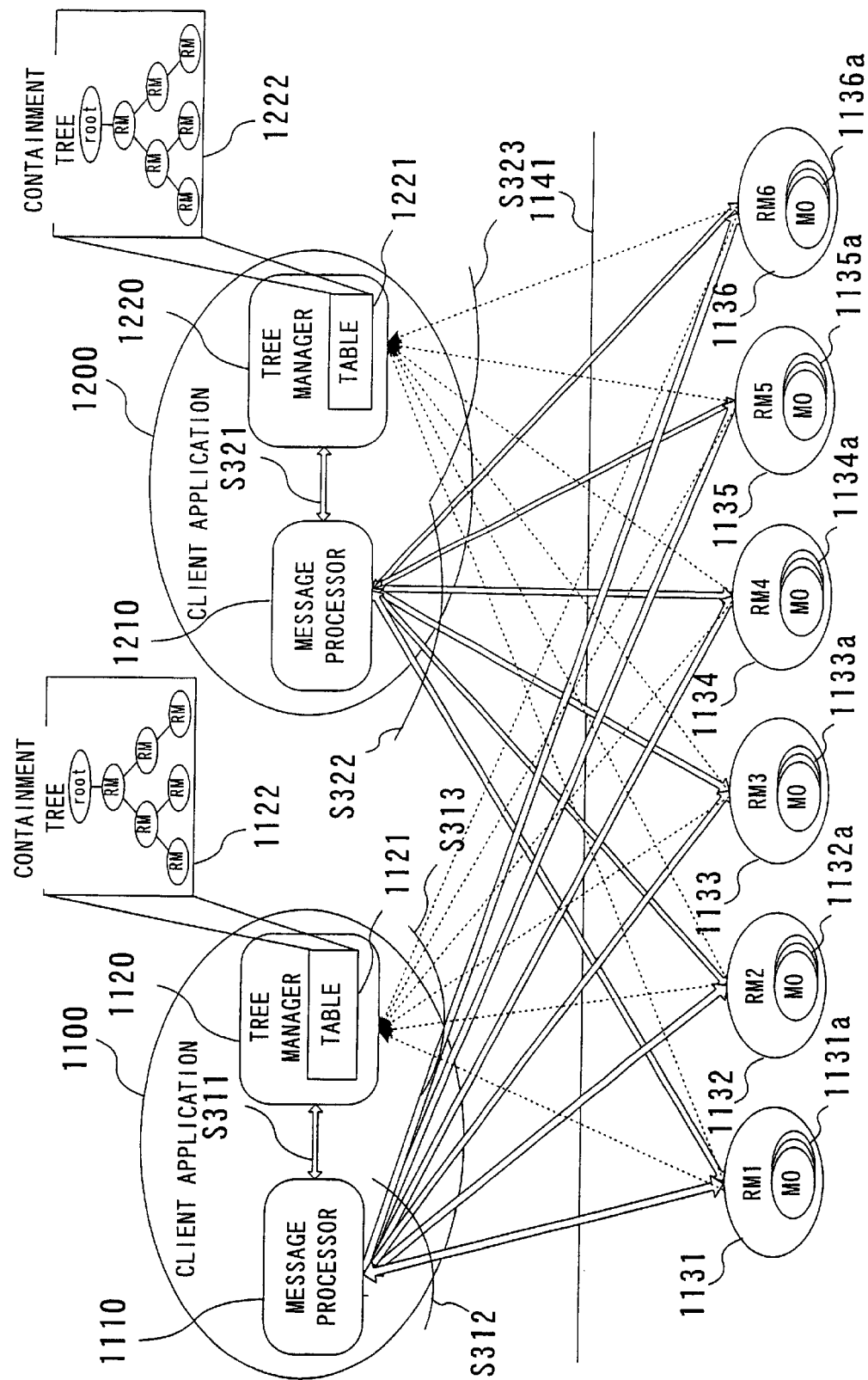
FIG. 41 is a block diagram of a conventional network management system.

FIG. 40 shows an example of exclusive control for operation request messages sent from host system applications. The message processor 210 has a message management table 211 to control the flow of incoming request messages, as described earlier in FIG. 18. Suppose here that the message processor 210 receives a specific operation request "Admin-get" from the host system application 301. The message processor 210 determines which RM is relevant to this "Admin-get" request, thus choosing an RM named "Admin" as the destination of the received operation request message. It further identifies the second portion "get" as the type of requested operation. In this way, the message processor 210 reaches a pertinent entry of the message management table 211. With the service status flag and message queue of that entry, the message processor 210 tests whether the RM of interest is busy or idle. Suppose that the service status flag exhibits a "BUSY" state as shown in FIG. 40. Since there exist two pending requests (REQ#1 and REQ#2) registered earlier, the message processor 210 adds the received operation request message to the end of the message queue, so that the message will wait for services at the third position (REQ#3). The message processor 210 processes those requests REQ#1, REQ#2, and REQ#3 in this progression until the message queue becomes empty. It then resets the service status flag to "IDLE" to indicate that there are no pending messages.

As seen in the message management table 211 of FIG. 40, several kinds of operations are supported by the system, including the following requests:

get: retrieve specified data set: set specified parameters action: execute specified process create: create new MOs delete: delete obsolete MOs Employing the object management techniques of the present invention, the above-described network management system permits client applications to send operation requests to manipulate objects without concern for the containment tree that describes structural relationships among available resources in the system. This means that client applications are decoupled from the containment tree structure which could be dynamically changed. The present invention further contributes to the improvement of system performance, since it reduces the amount of information to be exchanged between client applications and objects.

The proposed processing mechanisms are actually implemented as software functions of a computer system. The intended functions and their process steps are encoded in a computer program, which will be stored in a computer-readable storage medium. The computer system executes such programs to provide the intended effects of the present invention. Preferred computer-readable storage media may include magnetic storage media and solid state memory devices. In addition, some portable storage media, such as CD-ROMs and floppy disks, are particularly suitable for circulation purposes. It would also be possible to distribute programs through an appropriate server computer deployed on a network. Program files delivered to users are normally installed in their computers' hard drives or other local mass storage devices, and executed after being loaded to the main memory.

The above discussion will now be summarized as follows. According to the present invention, the proposed object management system and data process system comprise a tree manager and an object manager. The tree manager is designed to manage tree structure data that describes containment relationships among resource managers, while the object manager uses this tree structure data to identify the destinations of incoming operation request messages. Since the above mechanism distributes incoming request messages to relevant resource managers, client applications can send such messages without concern for the actual containment tree structure of objects. This means that client applications are decoupled from the structure of containment trees which could be dynamically changed. The proposed systems also alleviates processing workloads of the system, because there is no need for client applications to exchange messages directly with resource managers for object management purposes.

The present invention further provides a computer-readable medium containing an object management program and that containing a data processing program according to the present invention. When executed on an appropriate computer platform, those programs make concentrated management possible for maintaining tree structure data that represents containment relationships among a plurality of resource managers. Here, the computer plays as a coordinator which accept incoming operation request messages and redistribute them to appropriate resource managers.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data processing system for managing relationships among a plurality of objects by using a hierarchical containment tree model, the system comprising:

a plurality of resource managers that govern managed objects;

message processing means for receiving operation requests from a plurality of client applications which should be directed to the resource managers concerned, said message processing means comprising a plurality of message queues for separately queuing different types of operation requests directed to different resource managers, said message queues each having a service status flag to control exclusive execution of the operation requests being queued therein;

tree management means for maintaining tree structure data that defines containment relationships among the resource managers, together with identification data that is used to distinguish between the resource managers;

object management means for examining the tree structure data maintained in said tree management means to recognize the identification data of the destination resource manager to which the received operation request is directed, and sending the operation request to the destination resource manager; and object management means for examining the tree structure data maintained in said tree management means to find the identification data of the destination resource manager for which each of the received and queued operation requests should be destined, and sending each operation request to the destination resource managers that are found relevant thereto.

2. A computer-readable medium containing an object management program which manages relationships among a plurality of objects by using a hierarchical containment tree model, the object management program being designed to run on a computer system in order to cause the computer system to function as:

message processing means for receiving operation requests from a plurality of client applications which should be directed to the resource managers concerned, said message processing means comprising a plurality of message queues for separately queuing different types of operation requests directed to different resource managers, said message queues each having a service status flag to control exclusive execution of the operation requests being queued therein;

tree management means for maintaining tree structure data that defines containment relationships among the resource managers, together with identification data that is used to distinguish between the resource managers; and object management means for examining the tree structure data maintained in said tree management means to find the identification data of the destination resource manager for which each of the received and queued operation requests should be destined, and sending each operation request to the destination resource managers that are found relevant thereto.

3. A computer-readable medium containing a data processing program which manages relationships among a plurality of objects by using a hierarchical containment tree model, the data processing program being designed to run on a computer system in order to cause the computer system to function as:

a plurality of resource managers that govern managed objects;

message processing means for receiving operation requests from a plurality of client applications which should be directed to the resource managers concerned, said message processing means comprising a plurality of message queues for separately queuing different types of operation requests directed to different resource managers, said message queues each having a service status flag to control exclusive execution of the operation requests being queued therein;

tree management means for maintaining tree structure data that defines containment relationships among the resource managers, together with identification data that is used to distinguish between the resource managers; and object management means for examining the tree structure data maintained in said tree management means to find the identification data of a destination resource manager for which each of the received and queued operation requests should be destined, and sending each operation request to the destination resource managers that are found relevant thereto.

4. An object management system for managing relationships among resource managers that control managed objects by using a hierarchical containment tree model, comprising:

message processing means for receiving operation requests from a plurality of client applications which should be directed to the resource managers concerned, said message processing means comprising a plurality of message queues for separately queuing different types of operation requests directed to different resource managers, said message queues each having a service status flag to control exclusive execution of the operation requests being queued therein;

tree management means for maintaining tree structure data that defines containment relationships among the resource managers, together with identification data that is used to distinguish between the resource managers; and object management means for examining the tree structure data maintained in said tree management means to find the identification data of a destination resource manager for which each of the received and queued operation requests should be destined, and sending each operation request to the destination resource managers that are found relevant thereto.

5. The object management system according to claim 4, wherein: the object management system is coupled to a database that stores source information describing the containment relationships among the resource managers; and said tree management means reads out the information from the database when the object management system starts up, and keeps the obtained source information in a table that is disposed therein for use in the management of the tree structure data.

6. The object management system according to claim 5, wherein said tree management means updates the source data in the database when a change of the tree structure data is needed, whereby the tree structure data is always consistent with the source information.

7. The object management system according to claim 4, wherein:

said message processing means collects the identification data from the resource managers when the object management system starts up; and said tree management means manages the tree structure data by using the table to keep the identification data collected by said message processing means.

8. The object management system according to claim 4, wherein said tree management means updates the tree structure data according to a tree structure update request that is received.

9. The object management system according to claim 8, wherein:

said message processing means receives from the resource managers a notification message that indicates creation of a new resource manager or deletion of one of the existing resource managers; and said object management means sends the tree structure update request to said tree management means according to the notification message received by said message processing means.

10. The object management system according to claim 8, wherein:

if one of the resource managers is deleted, said object management means examines the tree structure data maintained in said tree management means to find lower-level resource managers that have been contained in the deleted resource manager; and if any lower-level resource managers are found, said object management means issues to said tree management means a tree structure update request pertaining to the deletion of said one of the resource managers, as well as deleting the found lower-level resource managers.

11. The object management system according to claim 4, wherein:

if creation of a new managed object is requested, said object management means searches the tree structure data maintained in said tree management means to find a higher-level resource manager of a resource manager which should govern the new managed object to be created; and if the higher-level resource manager is present, said object management means asks the higher-level resource manager to check whether there exists such a higher-level managed object that should contain the new managed object, and creates the new managed object only if the higher-level managed object exists.

12. The object management system according to claim 4, wherein:

if a client application has directly requested one of the resource managers to create a new managed object, said message processing means receives a request for checking whether there exists a higher-level managed object of the new managed object to be created;

in response to the request received by said message processing means, said object management means searches the tree structure data maintained in said tree management means to find a higher-level resource manager of a resource manager which should govern the new managed object to be created; and if the higher-level resource manager is found, said object management means asks the higher-level resource manager to check whether there exists such a higher-level managed object that should contain the new managed object, and creates the new managed object only if the higher-level managed object exists.

13. The object management system according to claim 4, wherein, if deletion of one of the managed objects is requested, said object management means requests all lower-level resource managers under the resource manager that governs the managed object to be deleted, to remove lower-level managed objects contained in the managed object to be deleted.

14. The object management system according to claim 4, wherein said message processing means has at least one message queue for storing every received operation request and sequentially processes the stored operation requests on a first out basis.

15. The object management system according to claim 14, wherein said message processing means has a plurality of message queues corresponding to the individual resource managers.

16. The object management system according to claim 14, wherein said message processing means has a plurality of message queues for separately queuing different types of operation requests directed to the individual resource managers.

* * * * *